US009248664B2

(12) United States Patent
Miller et al.

(10) Patent No.: US 9,248,664 B2
(45) Date of Patent: Feb. 2, 2016

(54) GRAPHIC ALIGNMENT FOR PRINTING TO AN ARTICLE USING A FIRST DISPLAY DEVICE AND A SECOND DISPLAY DEVICE

(71) Applicant: NIKE, Inc., Beaverton, OR (US)

(72) Inventors: Todd W. Miller, Portland, OR (US); Eli R. Troyke, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/720,346

(22) Filed: May 22, 2015

(65) Prior Publication Data

US 2015/0256691 A1 Sep. 10, 2015

Related U.S. Application Data

(60) Division of application No. 13/941,702, filed on Jul. 15, 2013, now Pat. No. 9,070,055, which is a continuation-in-part of application No. 13/557,935, filed on Jul. 25, 2012.

(51) Int. Cl.

| | |
|---|---|
| *B41J 3/46* | (2006.01) |
| *B41J 3/407* | (2006.01) |
| *A43D 95/14* | (2006.01) |
| *A43D 8/22* | (2006.01) |
| *G06F 3/042* | (2006.01) |

(52) U.S. Cl.

CPC .............. *B41J 3/4073* (2013.01); *A43D 8/22* (2013.01); *A43D 95/14* (2013.01); *B41J 3/46* (2013.01); *G06F 3/0425* (2013.01)

(58) Field of Classification Search

CPC ......... B41J 3/4073; B41J 3/46; B41F 17/006; B41F 17/34; B41F 17/38; B41F 33/0081; G03G 2215/00527; B41P 2217/61; A43D 8/26; A43D 8/28; A43D 8/30; A43D 95/14

See application file for complete search history.

(56) References Cited

U.S. PATENT DOCUMENTS

| | | | |
|---|---|---|---|
| 4,124,285 A | 11/1978 | Johnson et al. | |
| 4,846,058 A * | 7/1989 | Farris .................. | B41F 15/0813 101/123 |
| 4,862,377 A | 8/1989 | Reedman et al. | |
| 5,040,913 A | 8/1991 | Folkens et al. | |
| 5,168,294 A | 12/1992 | Davis et al. | |

(Continued)

FOREIGN PATENT DOCUMENTS

| | | |
|---|---|---|
| DE | 3938663 A1 | 5/1991 |
| EP | 0331108 A2 | 9/1989 |

(Continued)

OTHER PUBLICATIONS

International Preliminary Examination Report for PCT Application No. PCT/US2013/051765, mailed on Jan. 27, 2015.

(Continued)

*Primary Examiner* — Justin Olamit

(74) *Attorney, Agent, or Firm* — Plumsea Law Group, LLC

(57) ABSTRACT

A flexible manufacturing system for an article of footwear includes a printing system for printing graphics onto the footwear. The flexible manufacturing system includes a first display device that is transparent and which may be used to superimpose graphics over an article to align the article with the printing system. An optical device and a second display device provide a fixed viewing angle for a user aligning the article under the first display device.

19 Claims, 40 Drawing Sheets

(56) References Cited

U.S. PATENT DOCUMENTS

| | | | |
|---|---|---|---|
| 5,195,451 | A | 3/1993 | Nakashima |
| 5,588,216 | A | 12/1996 | Rank et al. |
| 5,646,859 | A | 7/1997 | Petta et al. |
| 6,029,867 | A | 2/2000 | Lee |
| 6,161,491 | A | 12/2000 | Takenoya et al. |
| 6,336,694 | B1 | 1/2002 | Ishizaka |
| 6,376,148 | B1 | 4/2002 | Liu et al. |
| 6,793,352 | B2 | 9/2004 | Karasawa et al. |
| 7,241,981 | B2 | 7/2007 | Hofmann |
| 7,526,997 | B2 | 5/2009 | Davidson |
| 7,796,802 | B2 * | 9/2010 | Smith .................. G06F 1/1626 324/760.01 |
| 7,876,472 | B2 * | 1/2011 | Gudan ..................... B41J 3/36 347/109 |
| 7,971,272 | B2 | 7/2011 | Bailey et al. |
| 7,987,779 | B2 | 8/2011 | Wang |
| 8,022,997 | B2 | 9/2011 | Shingu et al. |
| 2002/0080332 | A1 | 6/2002 | Jones et al. |
| 2005/0022686 | A1 | 2/2005 | Wessells et al. |
| 2006/0044286 | A1 * | 3/2006 | Kohlhaas ............ G02F 1/13338 345/173 |
| 2006/0221403 | A1 | 10/2006 | Bancel |
| 2008/0144053 | A1 | 6/2008 | Gudan et al. |
| 2008/0273175 | A1 | 11/2008 | Gallucci |
| 2011/0109686 | A1 | 5/2011 | McDowell et al. |
| 2012/0008101 | A1 | 1/2012 | Oka |
| 2012/0019511 | A1 | 1/2012 | Chandrasekhar |
| 2012/0069150 | A1 | 3/2012 | Rivera |
| 2012/0103210 | A1 | 5/2012 | Hashimoto |
| 2014/0026773 | A1 | 1/2014 | Miller |

FOREIGN PATENT DOCUMENTS

| | | |
|---|---|---|
| EP | 0401841 A2 | 12/1990 |
| EP | 2641661 A1 | 9/2013 |
| JP | H05293955 A | 11/1993 |
| JP | 2005004089 A | 1/2005 |
| JP | 2006139222 A | 6/2006 |
| JP | 2011039216 A | 2/2011 |
| WO | 9626838 A1 | 9/1996 |
| WO | 2012038446 A1 | 3/2012 |

OTHER PUBLICATIONS

International Preliminary Examination Report for PCT Application No. PCT/US2013/051766, mailed on Jan. 27, 2015.
International Search Report and Written Opinion for Application No. PCT/US2013/051765, mailed on Nov. 15, 2013.
International Search Report and Written Opinion for Application No. PCT/US2013/051766, mailed on Nov. 22, 2013.
Office Action mailed May 14, 2014 for U.S. Appl. No. 13/557,963.
Office Action mailed Feb. 18, 2015 for U.S. Appl. No. 13/557,935, filed Jul. 25, 2012.
Office Action mailed Jul. 29, 2015 for Chinese Patent Application No. 201380039308.0 and the English translation thereof.
Office Action mailed Aug. 13, 2015 for Chinese Patent Application No. 201380038992.0 and the English translation thereof.

* cited by examiner

GRAPHIC ALIGNMENT FOR PRINTING TO AN ARTICLE USING A FIRST DISPLAY DEVICE AND A SECOND DISPLAY DEVICE

RELATED APPLICATIONS

This application is a divisional application of U.S. Patent Application Publication Number 2014/0029030, which is a continuation in part of U.S. Patent Publication Number 2014/0026773, the entirety of each of which is hereby incorporated by reference.

BACKGROUND

The present embodiments relate generally to articles of footwear and in particular to a flexible manufacturing system for an article of footwear.

Flexible manufacturing systems may include systems and other resources for manufacturing articles, including articles of footwear. The systems may be used for fabricating components or an entire article. The systems can also be used to add color, designs, and/or structural features to an article after the article has been manufactured and sent to a retail store or other location.

SUMMARY

In one aspect, a method of printing onto to an article includes displaying a graphic on a transparent display device that is disposed between the article and an optical device and using image information captured by the optical device to align the graphic on the article while the article and a printing system are in a first relative configuration. The method also includes changing the relative configuration of the article and the printing system from the first relative configuration to a second relative configuration, where the second relative configuration is substantially different from the first relative configuration. The method also includes printing a printed graphic onto the article while the article and the printing system are in the second relative configuration.

In another aspect, a method of printing onto to an article includes placing a first display device over the article while the article and a printing system are in a first relative configuration, where the first display device has a transparent display screen. The method also includes displaying a graphic on the first display device, capturing image information associated with the graphic and the article and displaying the captured image information on a second display device. The method also includes aligning the graphic with a predetermined portion of the article while the article and the printing system are in the first relative configuration. The method also includes changing the relative configuration of the article and the printing system from the first relative configuration to a second relative configuration, where the second relative configuration is substantially different from the first relative configuration. The method also includes printing a printed graphic onto the predetermined portion of the article while the article and the printing system are in the second relative configuration.

In another aspect, a flexible manufacturing system for an article includes a printing system and a first display device that is calibrated with the printing system, where the first display device is transparent and wherein the first display device can be used to align a graphic that is to be printed onto the article by the printing system. The flexible manufacturing system also includes an optical device for capturing image information associated with the first display device and the article and a second display device configured to display the image information. The second display device provides a fixed viewing angle for aligning the graphic with the article. The viewing angle is an angle between a line of sight connecting the optical device and the article and a surface of the first display device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
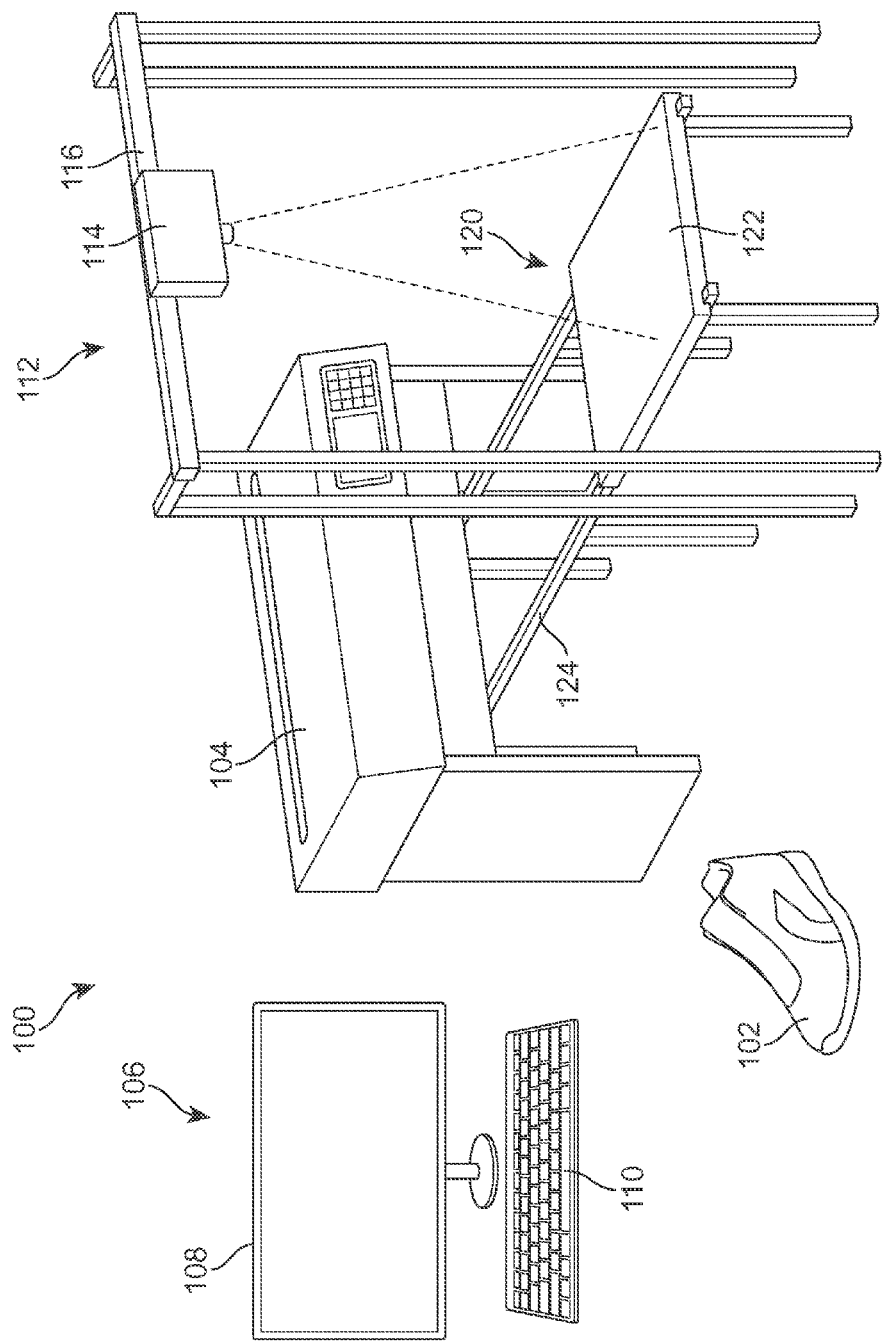
FIG. 1 is a schematic view of an embodiment of a flexible manufacturing system.

FIG. 1 is a schematic view of an embodiment of flexible manufacturing system 100. In some embodiments, flexible manufacturing system 100 may be intended for use with various kinds of articles including footwear and/or apparel. In particular, flexible manufacturing system 100 may include various kinds of provisions for applying graphics, or any type of design or image, to footwear and/or apparel. Moreover, the process of applying graphics may occur during manufacturing and/or after an article has been manufactured. For example, graphics may be applied to an article of footwear after the article of footwear has been manufactured into a three-dimensional form including an upper and sole structure.

The term "graphic" as used throughout this detailed description and in the claims refers to any visual design elements including, but not limited to: photos, logos, text, illustrations, lines, shapes, images of various kinds as well as any combinations of these elements. Moreover, the term graphic is not intended to be limiting and could incorporate any number of contiguous or non-contiguous visual features. For example, in one embodiment, a graphic may comprise a logo that is applied to a small region of an article of footwear. In another embodiment, a graphic may comprise a large region of color that is applied over one or more regions of an article of footwear.

For clarity, the following detailed description discusses an exemplary embodiment, in which flexible manufacturing system 100 is used to apply graphics to article of footwear 102. In this case, article of footwear 102, or simply article 102, may take the form of an athletic shoe, such as a running shoe. However, it should be noted that the other embodiments could be used with any other kinds footwear including, but not limited to: hiking boots, soccer shoes, football shoes, sneakers, rugby shoes, basketball shoes, baseball shoes as well as other kinds of shoes. While FIG. 1 shows a single article, it will be understood that flexible manufacturing system 100 could be used to apply graphics to two or more articles, including articles that make up a pair of footwear.

Flexible manufacturing system 100 need not be limited to use with articles of footwear and the principles taught throughout this detailed description may be applied to additional articles as well. Generally, these principles could be applied to any article that may be worn. In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment. Additionally, in some embodiments, the article could be another type of article that is not configured to be worn, including, but not limited to: balls, bags, purses, backpacks, as well as other articles that may not be worn.

Flexible manufacturing system 100 may comprise various provisions that are useful in applying a graphic directly to an article. In some embodiments, flexible manufacturing system 100 may include printing system 104. Printing system 104 may comprise one or more individual printers. Although a single printer is illustrated in FIG. 1, other embodiments could incorporate two or more printers that may be networked together.

Printing system 104 may utilize various types of printing techniques. These can include, but are not limited to: toner-based printing, liquid inkjet printing, solid ink printing, dye-sublimation printing, inkless printing (including thermal printing and UV printing), MEMS jet printing technologies as well as any other methods of printing. In some cases, printing system 104 may make use of a combination of two or more different printing techniques. The type of printing technique used may vary according to factors including, but not limited to: material of the target article, size and/or geometry of the target article, desired properties of the printed image (such as durability, color, ink density, etc.) as well as printing speed, printing costs and maintenance requirements.

In one embodiment, printing system 104 may utilize an inkjet printer in which ink droplets may be sprayed onto a substrate, such as the medial or lateral side panel of a formed upper. Using an inkjet printer allows for easy variation in color and ink density. This arrangement also allows for some separation between the printer head and the target object, which can facilitate printing directly to objects with some curvature and/or surface texture.

Flexible manufacturing system 100 can include provisions for facilitating the alignment of a printed graphic onto article 102. In some embodiments, it may be useful to provide a user with a way of aligning an article with a printing system so as to ensure a graphic is printed in the desired portion of the article. In particular, flexible manufacturing system 100 may include provisions for pre-aligning an article with a printer in such a way as to accommodate articles of various types, shapes and sizes.

In some embodiments, flexible manufacturing system 100 may include alignment system 112. Alignment system 112 may be seen to further comprise a projection system 114 and a transfer system 120. In some embodiments, projection system 114 comprises one or more projectors that are capable of displaying images onto one or more portions of an article. Although a single projector is shown in the current embodiment, other embodiments may include two or more projectors. In embodiments where two or more projectors are used, the projectors may operate cooperatively or independently to display one or more graphics onto the surface of an article. Furthermore, as discussed in further detail below, a projection system could incorporate additional provisions including, for example, mirrors, various kinds of lenses, screens for displaying images as well as any other provisions that may be required to generate and display a projected image.

Various kinds of projectors can be used and it will be understood that projection system 114 is not limited to a particular kind of projection technology. Examples of different projector technologies that can be used with projection system 114 include, but are not limited to: CRT projection, LCD projection, DLP projection, LCoS projection, LED projection, Hybrid LED projection, Laser diode projection as well as any other kinds of projection technologies. The type of projection technology used may be selected according to various factors including ease of use, compatibility with other systems, visual clarity of the displayed image on the surface of an article as well as any other factors or constraints associated with the operation of flexible manufacturing system 100.

Some embodiments can include provisions for supporting projection system 114. In some embodiments, support frame 116 is provided. Support frame 116 may comprise any kind of frame and may further include provisions for temporarily fixing the position of projection system 114 in place with respect to flexible manufacturing system 100. In some cases, support frame 116 includes features that allow the position of projection system 114 to be easily adjusted. In particular, some embodiments may allow the position of projection system 114 to be changed in horizontal and vertical directions. This could be accomplished in some cases by adjusting the position of support frame 116 and/or by adjusting the location to which projection system 114 is attached to support frame 116. Although the attachment of projection system 114 to support frame 116 is shown schematically in this embodiment, other embodiments could utilize any type of mounting systems for permanently or adjustable mounting projection system 114 to support frame 116.

Transfer system 120 may comprise one or more cooperating systems that facilitate the movement of an article between printing system 104 and projection system 114. In some embodiments, transfer system 120 may be designed so that once a projected graphic has been aligned in the desired location on an article, the article can be transferred to printing system 104 in a manner that maintains the desired alignment. Details of this alignment method are discussed in further detail below.

In one embodiment, transfer system 120 can include platform 122 and tracks 124. In some embodiments, platform 122 is a generally planar structure that is adapted to hold one or more articles of footwear and/or other kinds of apparel. Specifically, platform 122 may be large enough to accommodate at least one article of footwear such that the article of footwear can be moved to different locations of platform 122.

In some embodiments, tracks 124 are adapted to guide platform 122 between at least two predetermined positions associated with printing system 104 and projection system 114, respectively. In FIG. 1, tracks 124 are illustrated as being independently supported, however other embodiments could utilize a supporting table to which tracks 124 are mounted.

With platform 122 mounted to tracks 124 in a slidable manner, platform 122 may be easily adjusted between a first, or display ready, position and a second, or print ready, position. Moreover, some embodiments can include provisions for temporarily locking the position of platform 122 in the first position and/or second position. By transferring an article between projection system 114 and printing system 104 using transfer system 120, the orientation and relative position of the article can be held constant, as discussed in further detail below.

The current embodiment illustrates a transfer system 120 that can be operated manually by a user. However, it is contemplated that other embodiments could incorporate provisions for automating the operation of transfer system 120. For example, some embodiments could include motors and/or other provisions for automatically driving platform 122 to various positions along tracks 124. Moreover, in such automated embodiments, the position and/or speed of platform 122 could be adjusted using controls provided at transfer system 120 or using an associated system, such as computing system 106 which is discussed in further detail below.

In some embodiments, platform 122 may be specifically adapted to secure an article in a fixed position or orientation. For example, some embodiments may include various kinds of mounting devices, harnesses or other provisions that may temporarily fix or hold the position of an article relative to platform 122. Such provisions may help precisely orient a specific portion of an article towards a projector (and correspondingly towards a printer). For example, some embodiments could utilize a harness that fixes the orientation and position of an article on platform 122 so that a projected graphic can be projected onto any desired portion of the article of footwear. These provisions may also reduce the tendency of an article to move or jostle as the position of platform 122 is adjusted.

Flexible manufacturing system 100 may include provisions for supplying printing system 104 and/or projection system 114 with one or more graphics. In some embodiments, flexible manufacturing system 100 may include computing system 106. The term "computing system" refers to the computing resources of a single computer, a portion of the computing resources of a single computer, and/or two or more computers in communication with one another. Any of these resources can be operated by one or more users. In some cases, computing system 106 can include user input device 110 that allow a user to interact with computing system 106. Likewise, computing system 106 may include display 108. Moreover, computing system 106 can include additional provisions, such as a data storage device (not shown). A data storage device could include various means for storing data including, but not limited to: magnetic, optical, magneto-optical, and/or memory, including volatile memory and non-volatile memory. These provisions for computing system 106, as well as possibly other provisions not shown or described here, allow computing system 106 to facilitate the creation, storage and export of graphics to any or all of the devices and systems described here and shown in FIG. 1.

For purposes of facilitating communication between printing system 104, computing system 106, and/or projection system 114, these systems can be connected using a network of some kind. Examples of networks include, but are not limited to: local area networks (LANs), networks utilizing the Bluetooth protocol, packet switched networks (such as the Internet), various kinds of wired networks, wireless networks as well as any other kinds of networks. In other embodiments, rather than utilizing an external network, printing system 104 and/or projection system 114 could be connected directly to computing system 106, for example, as peripheral hardware devices.

Figure 2:
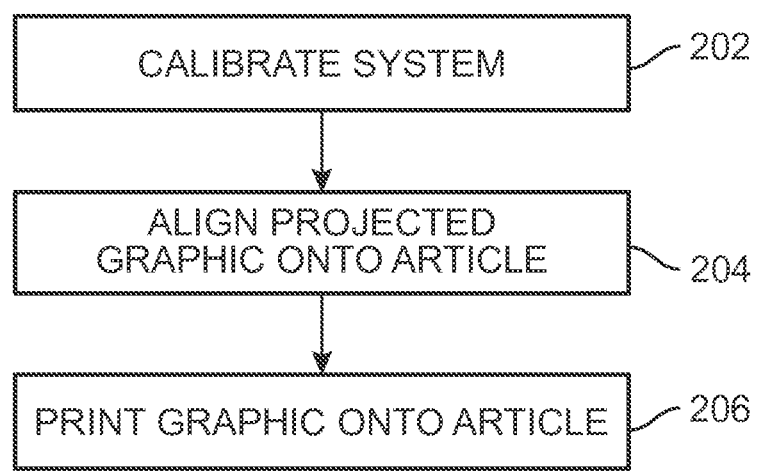
FIG. 2 is a schematic view of a process for customizing an article according to one embodiment.

FIG. 2 illustrates a process for adding a graphic to an article using flexible manufacturing system 100 described above. It will be understood that some embodiments could include additional steps not discuss here. In other embodiments one or more of the following steps may be optional. Furthermore, in some cases some of the following steps could be accomplished by different systems and/or users. For example, in some embodiments a calibration step may be performed by a first operator of the system, while alignment and printing could be performed by a second operator of the system.

During step 202, one or more calibration processes may be performed. In some embodiments, projection system 114 may be calibrated with printing system 104, relative to platform 122. In particular, projection system 114 may be calibrated in a manner so that the relative positions and orientations of graphics displayed onto platform 122 correspond substantially identically to the relative positions and orientations of graphics that are printed onto a substrate (such as paper) lying directly over platform 122.

Next, during step 204, a projected graphic is displayed on an article residing on platform 122. In this step, the relative position of the projected graphic on the article may be adjusted. In some cases, this could be achieved by moving the position and orientation of the article on platform 122 while keeping the position of the projected graphic fixed. In other cases, this could be achieved by adjusting the position of the projected graphic while keeping the position of the article fixed. Thus, for example, if the projected graphic is displayed at the heel of the article, but the user wants the graphic on the forefoot, the projected graphic can be moved until the projected graphic is aligned with the desired region of the article.

Finally, during step 206, once the display graphic has been properly aligned with the article, the article may be moved to the printing system 104. At this point, a printed graphic corresponding to the projected graphic can be printed onto the desired region of the article.

Flexible manufacturing system 100 may include provisions to calibrate one or more components. In some embodiments, flexible manufacturing system 100 can include provisions that calibrate the operation of printing system 104 and projection system 114. In particular, in some cases, projection system 114 may be calibrated so that the alignment of a projected graphic on an article using projection system 114 corresponds to a similar alignment of a printed graphic on the article using printing system 104. The term "projected graphic" as used throughout this detailed description and in the claims refers to any graphic that is produced by projection system 114. Furthermore, the term "printed graphic" as used throughout this detailed description and in the claims refers to any graphic that is produced by printing system 104.

Figure 3:
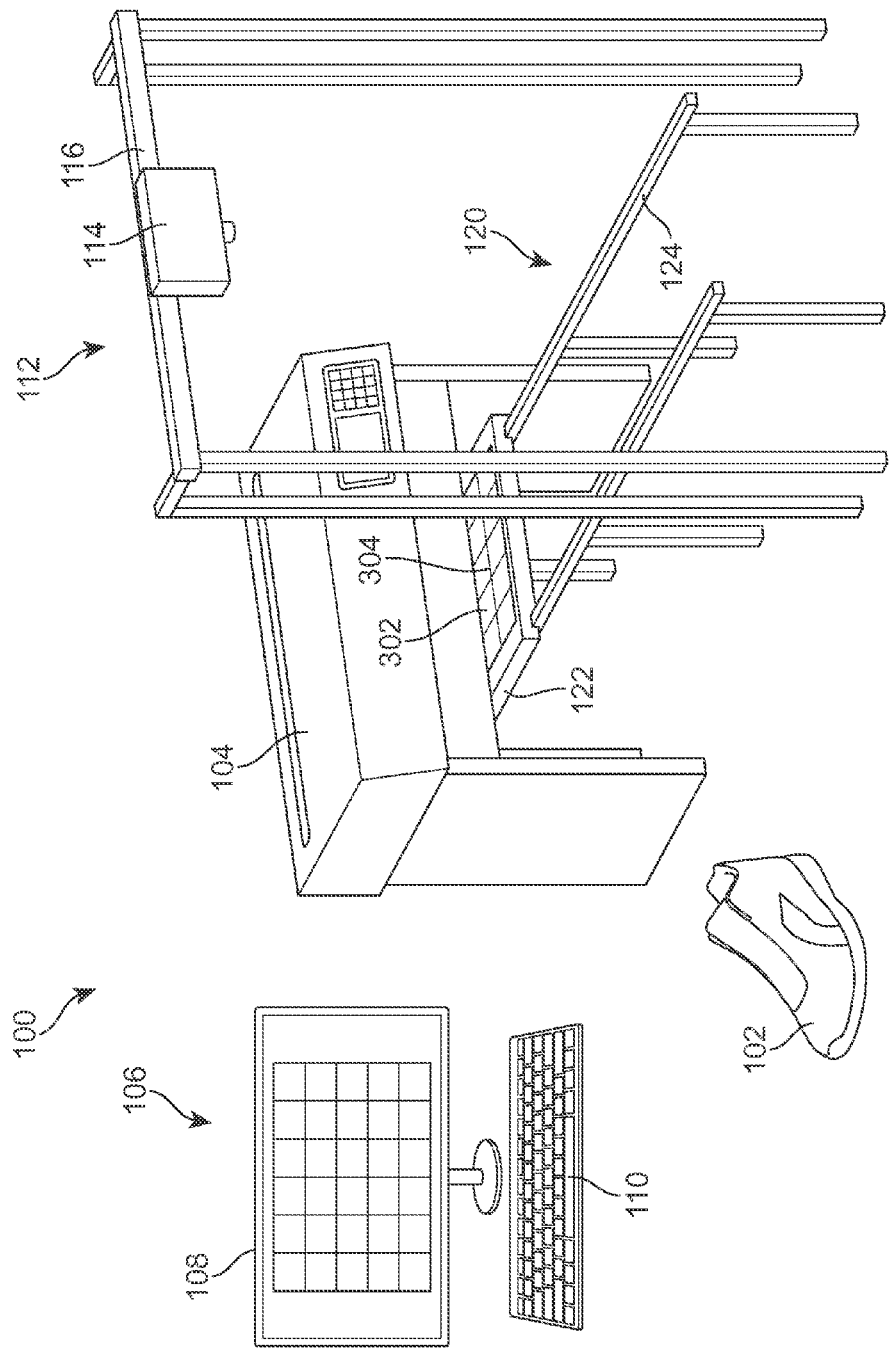
FIG. 3 is a schematic view of an embodiment of a flexible manufacturing system, including a step of printing a test grid.

Referring to FIG. 3, the calibration process starts when a printed graphic is printed to sheet 302. In this case, test grid 304 is printed onto sheet 302. Test grid 304 may comprise horizontal and vertical lines. The spacing, thickness and any other properties of these lines could be varied in different embodiments. Although the current embodiment uses a test grid, other embodiments could use any other kind of testing graphic, including any other pattern.

Figure 4:
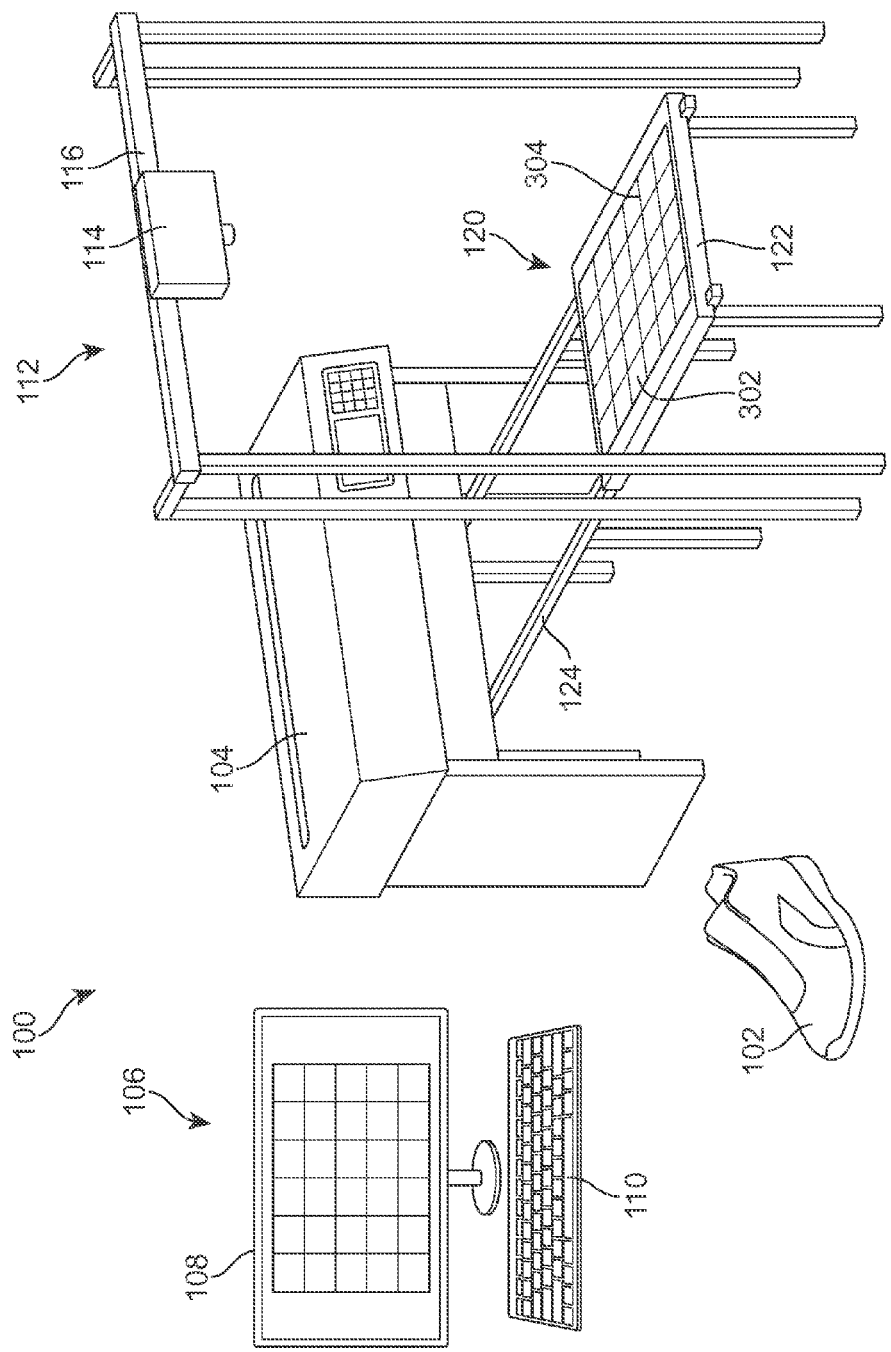
FIG. 4 is a schematic view of an embodiment of a flexible manufacturing system, including a step of moving a platform to a display ready position.

Next, as seen in FIG. 4, platform 122 may be moved from the print ready position to the display ready position. In order to facilitate proper calibration, the print ready position and the display ready position may be distinguished from any possible intermediate positions along tracks 124. In some embodiments, this may be accomplished by markings along tracks 124. In other embodiments, this may be accomplished using features that make the user aware that platform 122 is in either the print read or display read position, such as temporarily locking platform 122 in either position.

Figure 5:
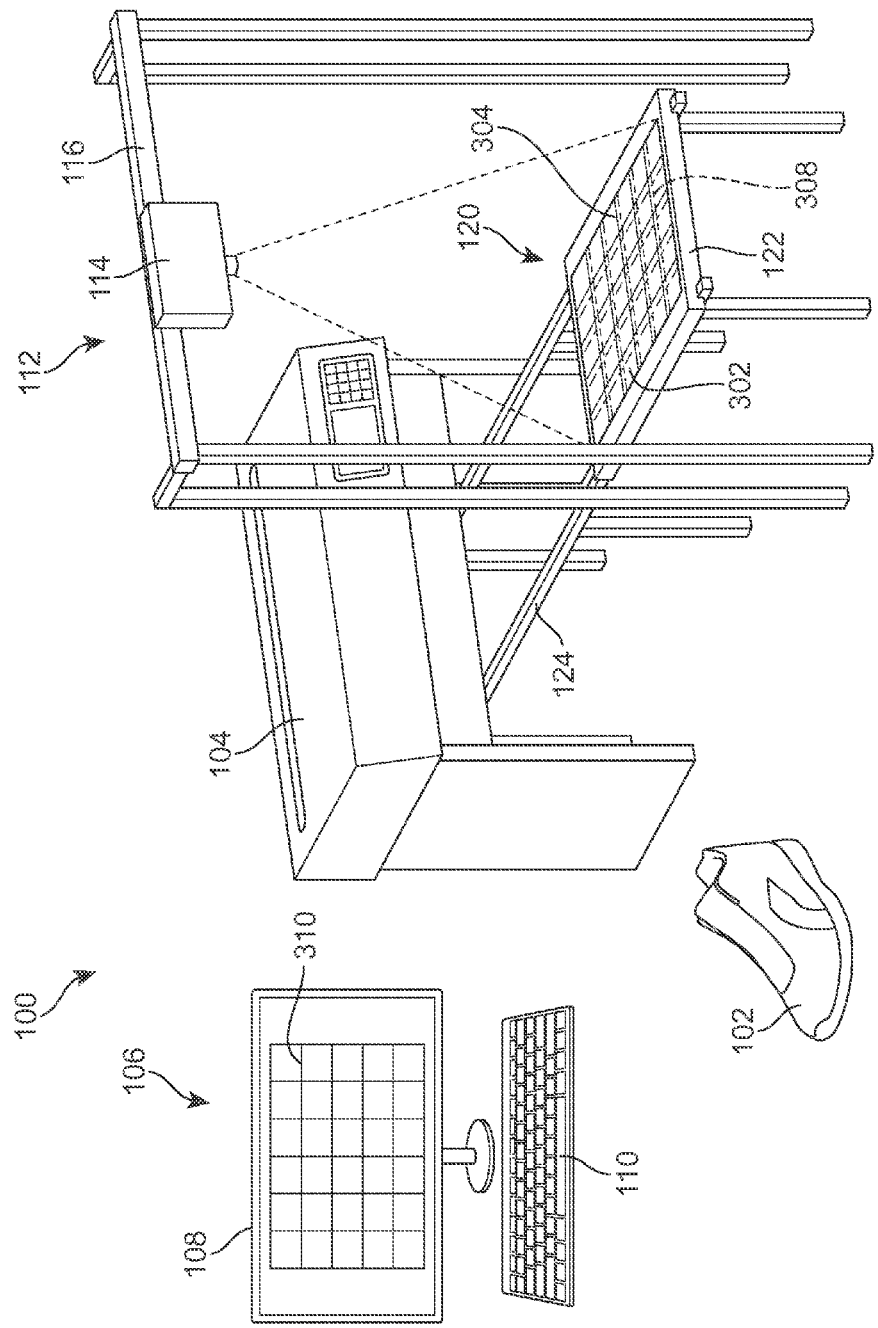
FIG. 5 is a schematic view of an embodiment of a flexible manufacturing system, including a step of projecting a test grid onto the printed grid.

Once platform 122, which carries sheet 302 and printed test grid 304, has been moved to the display ready position, projection system 114 may be operated to project a projected graphic. In this case, projection system 114 may be operated to project test grid 308, as seen in FIG. 5. In some embodiments, both printed test grid 304 and the projected test grid 308 may be created from a single computer graphic, such as test graphic 310, that is generated by computing system 106. In other embodiments, however, printing system 104 and projection system 114 may each generate a test grid from locally stored information, rather than information received from computing system 106.

As seen in FIG. 5, printed test grid 304 and projected test grid 308 may not be initially aligned. In order to calibrate the operation of projection system 114 with printing system 104, projection system 114 may be modified until projected test grid 308 is substantially coincident with printed test grid 304. In some cases, this can be accomplished by adjusting the position of projection system 114 along support frame 116, as shown clearly in FIG. 6.

Figure 6:
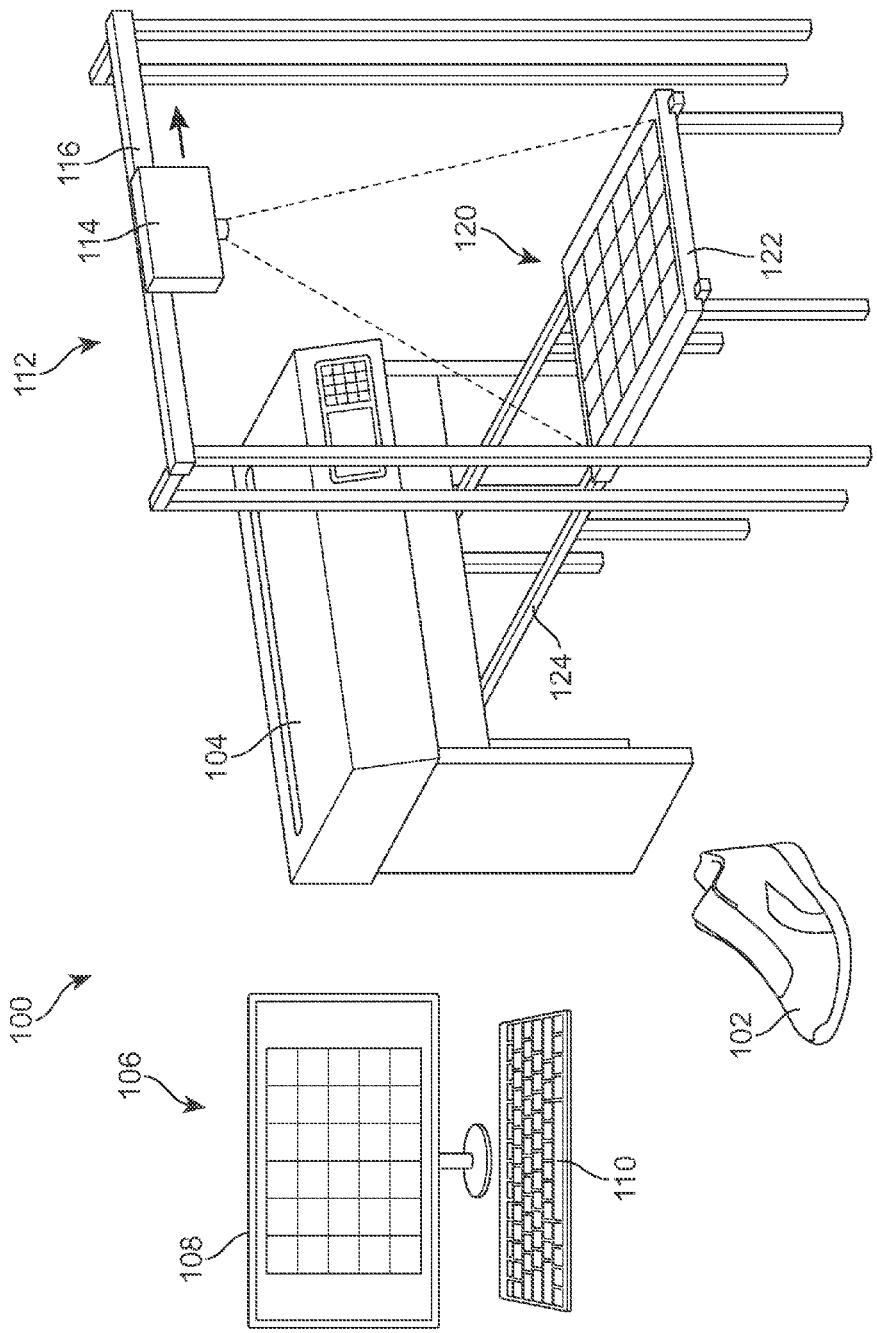
FIG. 6 is a schematic view of an embodiment of a flexible manufacturing system, including a step of adjusting the position of the projection system to align the projected test grid with the printed test grid.

FIG. 6 shows an example where the projection system is adjusted until the projected graphic is aligned with the printed graphic. In this case, the horizontal position of projection system 114 may be adjusted to align displayed test grid 308 and printed test grid 310. However, other cases may include any other kind of movement, including repositioning projection system 114 in any of the usual x, y and z spatial directions. Moreover, some cases may include steps of adjusting the focus of projection system 114 to better align displayed test grid 308 with printed test grid 310. With the calibration process completed, projection system 114 may be properly registered to platform 122.

Figure 7:
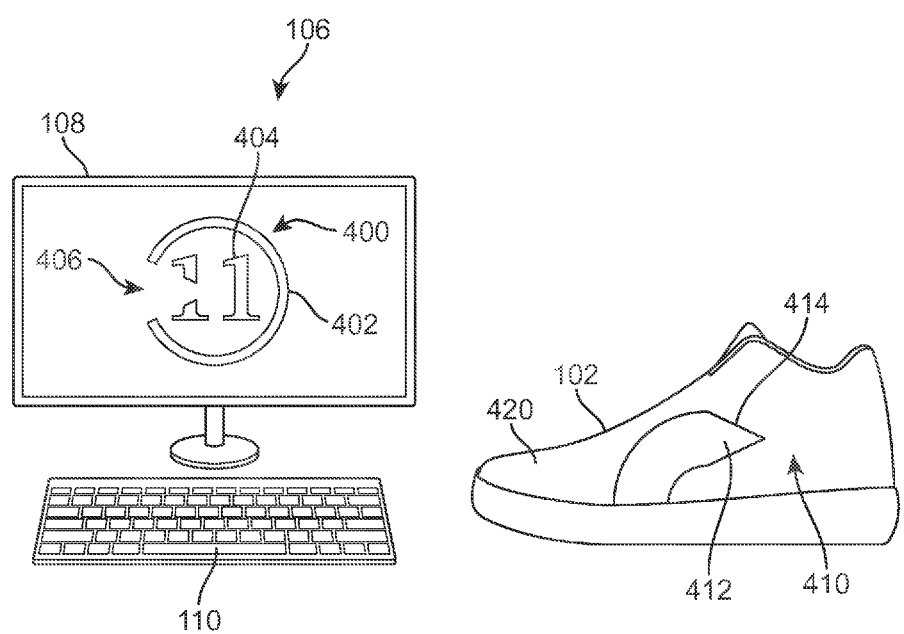
FIG. 7 is a schematic view of an embodiment of a computer graphic that has been designed to be printed onto an article of footwear.

FIG. 7 illustrates a schematic view of an embodiment of a computer graphic 400 that may be applied to article 102. Computer graphic 400 could be stored using computing system 106. In some embodiments, computer graphic 400 may be retrieved from another source. In other embodiments, computer graphic 400 could be designed using software associated with computing system 106. In one embodiment, computer graphic 400 may be a custom designed image that may be applied to article 102 for the purposes of customizing article 102 to suit a particular customer or user.

In one embodiment, computer graphic 400 comprises several design elements including a border 402 and numbers 404. Furthermore, computer graphic 400 may be designed for application to predetermined portion 410 of upper 420. By applying computer graphic 400 to article 102 through printing, article 102 will be configured with a custom graphic.

A computer graphic can be designed with provisions to prevent overlap between a printed graphic and one or more features of an article. For example, some embodiments may utilize graphic templates that help mask one or more portions of a graphic. Such graphic templates could be created using information about the article, including, for example, design information. The masked portions may generally correspond to locations on an article where it may be undesirable to print, such as onto a piece of trim, or onto an existing graphic or image.

In some embodiments, computer graphic 400 can include masked portion 406. In some cases, masked portion 406 comprises a concave, or non-convex, portion of computer graphic 400. Masked portion 406 may be used to prevent printing onto trim element 412 of upper 420. As seen in FIG. 7, the geometry of masked portion 406 may approximately correspond with the geometry of rearward end portion 414 of trim element 412. For example, masked portion 406 may have an approximately triangular shape that coincides with the approximately triangular shape of rearward end portion 414.

Figure 8:
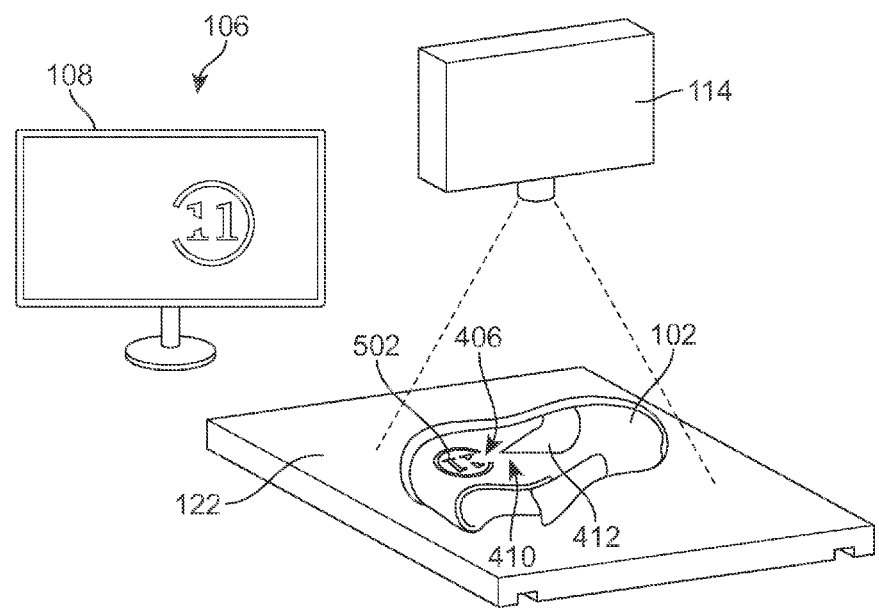
FIG. 8 is a schematic view of an embodiment of a step of projecting a projected graphic onto an article of footwear.
Figure 9:
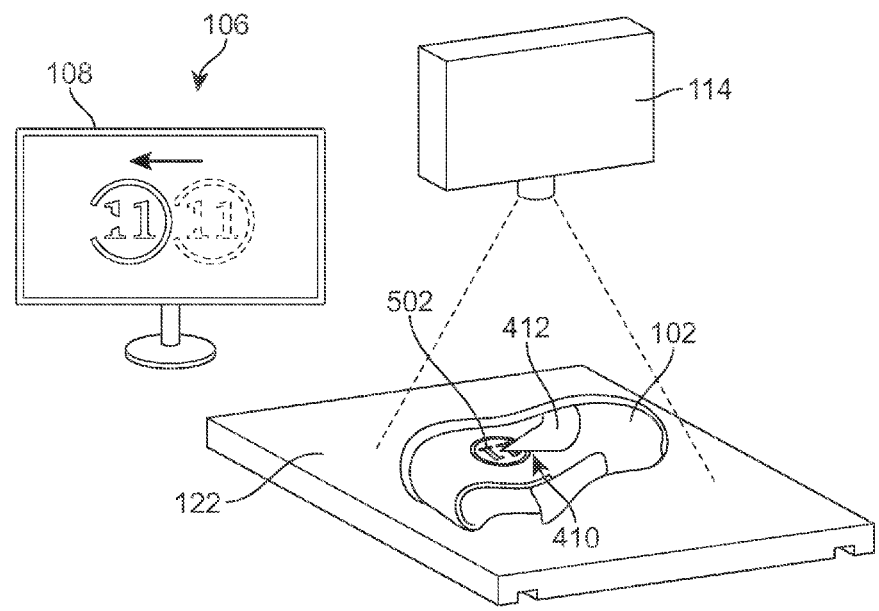
FIG. 9 is a schematic view of an embodiment of a step of aligning a projected graphic onto a predetermined portion of an article of footwear.

FIGS. 8 and 9 illustrate schematic views of a process of aligning a projected graphic 502 onto article 102. In some embodiments, the projected graphic 502 may be generated using information received about computer graphic 400. In some cases, for example, information about computer graphic 400 may be sent from computing system 106 to projection system 114.

Referring first to FIG. 8, initially projected graphic 502 may be disposed in a location adjacent to the predetermined region 410 where the user would like the graphic to be printed. In order to align projected graphic 502 in the proper location the position and/or orientation of projected graphic 502 may be adjusted. In some embodiments, the position of projected graphic 502 may vary as a user adjusts the position of computer graphic 400 on display 108. As seen by comparing the configurations of FIG. 8 and FIG. 9, the position of projected graphic 502 can be adjusted until it is properly aligned within predetermined portion 410. Moreover, in some cases, projected graphic 502 is aligned so that masked portion 406 substantially coincides with rearward end portion 414 of trim element 412. It should be understood that in some embodiments, the position of projected graphic 502 on article 102 could also be adjusted by moving article 102 on platform 122. In other words, the alignment of projected graphic 502 on article 102 may be accomplished by adjusting the relative positions of projected graphic 502 and article 102 in any manner.

Figure 10:
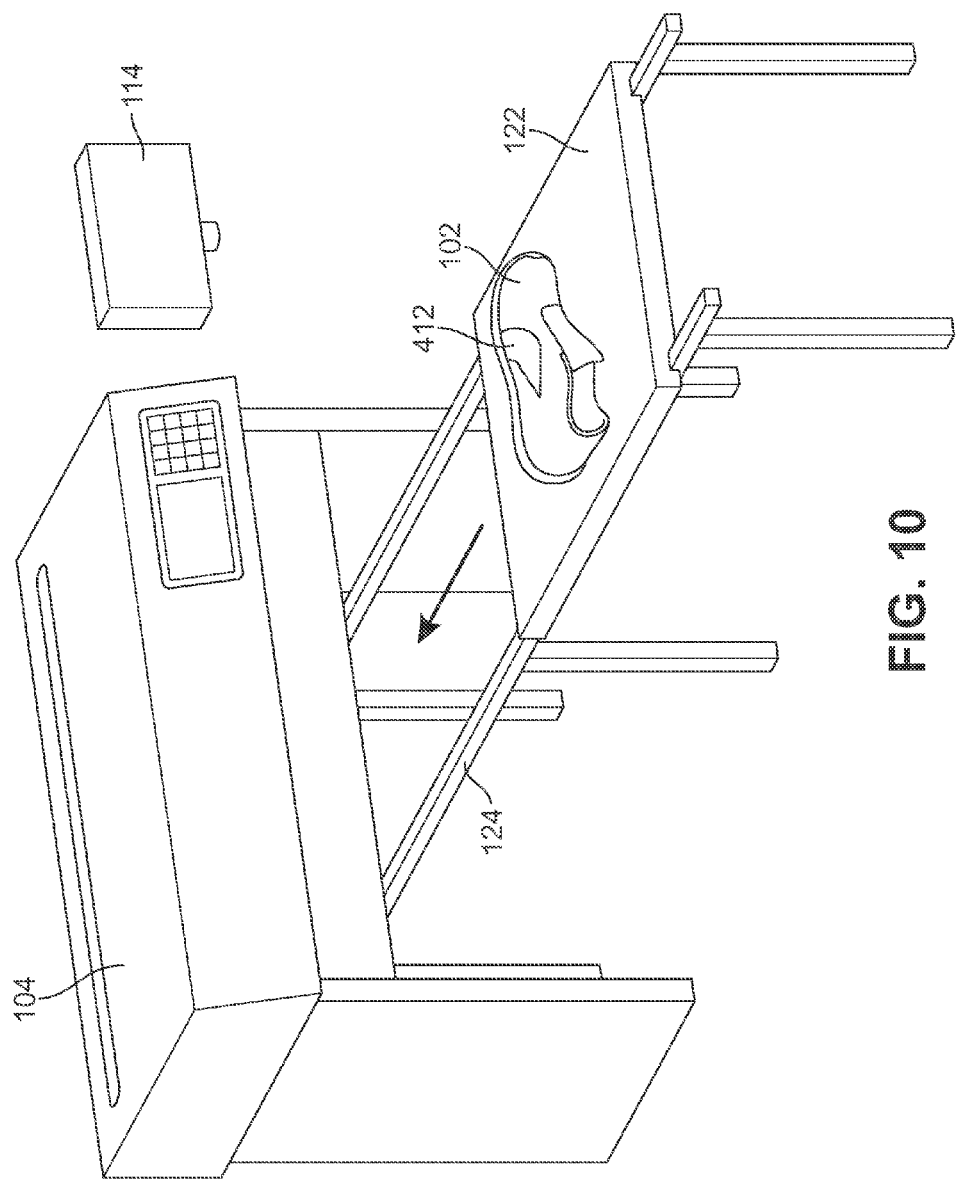
FIG. 10 is a schematic view of an embodiment of a step of moving a platform from a display ready position to a print ready position.
Figure 11:
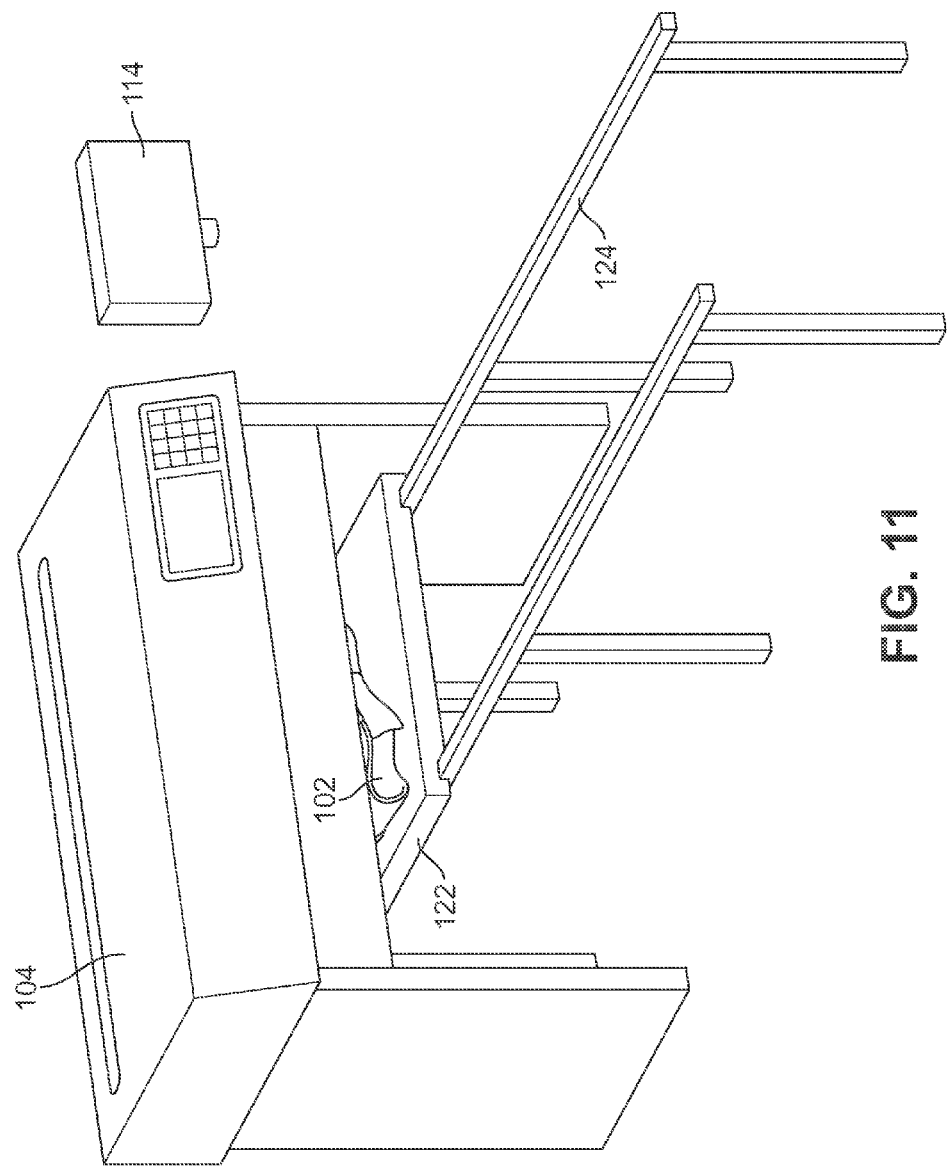
FIG. 11 is a schematic view of an embodiment of a step of printing a graphic onto an article.
Figure 12:
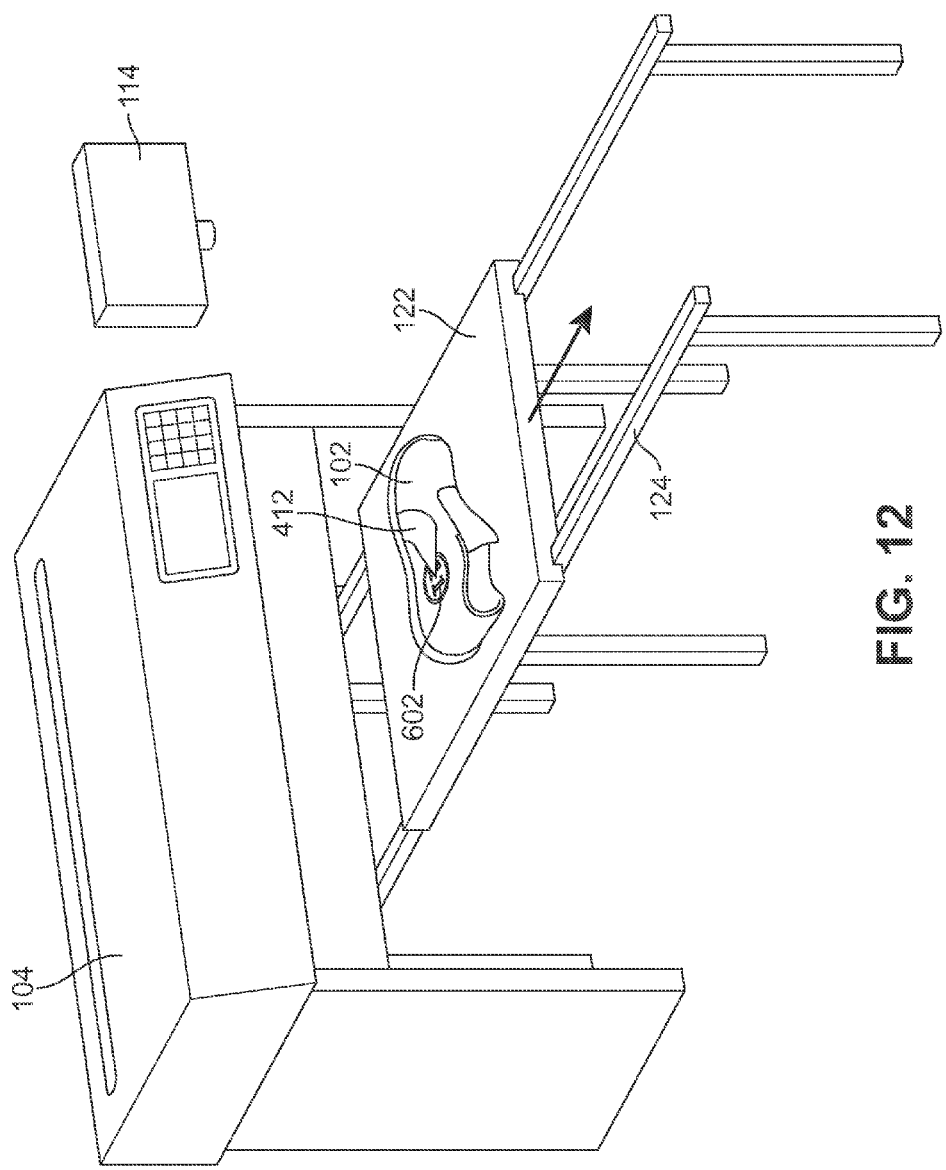
FIG. 12 is a schematic view of an embodiment in which an article includes a recently printed graphic.

FIGS. 10 through 12 illustrate a schematic view of a process of printing a graphic on an article following alignment with projection system 114. Referring to FIG. 10, platform 122 may be moved from the display ready position to the print ready position. In some cases, a user may manually adjust the position of platform 122 along tracks 124. In other cases, platform 122 may be automatically repositioned along tracks 124.

Referring to FIG. 11, platform 122 may be in the print ready position, in which article 102 is disposed beneath one or more print heads of printing system 104. At this point, printed graphic 602 (see FIG. 12) may be printed to predetermined portion 410. In some embodiments, printed graphic 602 corresponds to computer graphic 400. In some embodiments, printed graphic 602 may be generated using information about computer graphic 400 that is received from computing system 106. Finally, as seen in FIG. 12, printed graphic 602 has been printed in predetermined portion 410. Moreover, printed graphic 602 is positioned and oriented as to not overlap with trim element 412, as previously described.

A flexible manufacturing system can include provisions to increase usability of a system. In some embodiments, the arrangement of a printing system and a projecting system can be selected to improve usability, for example, by arranging the projecting system in a manner that increases focal length. Increasing focal length of the projection system may facilitate enhanced usability and accuracy of the system.

Figure 13:
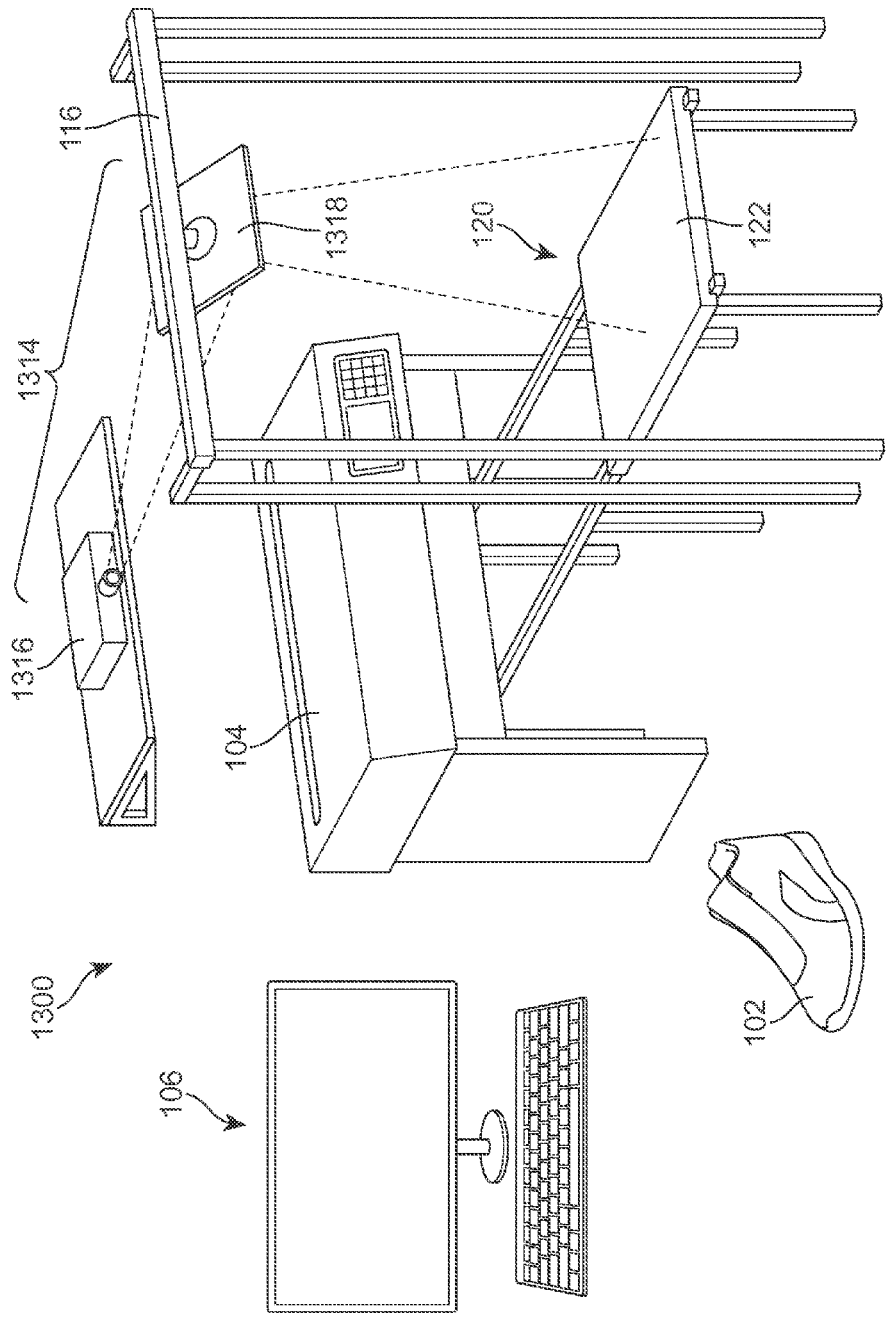
FIG. 13 is a schematic view of another embodiment of a flexible manufacturing system.
Figure 14:
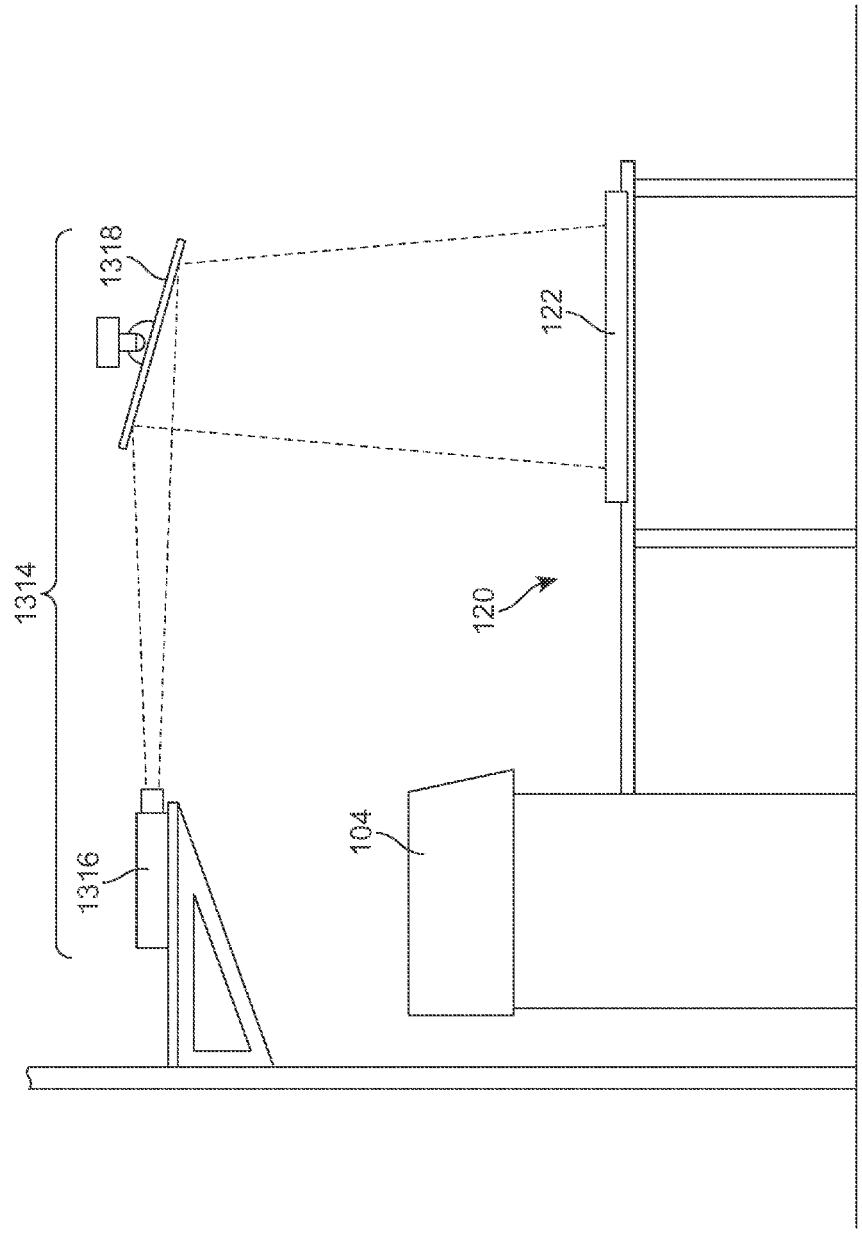
FIG. 14 is a schematic side view of the flexible manufacturing system of FIG. 13.

FIGS. 13 and 14 illustrate schematic isometric and schematic side views, respectively, of another embodiment of a flexible manufacturing system 1300. Referring to FIGS. 13 and 14, flexible manufacturing system 1300 may be similar in some, but not all, respects to flexible manufacturing system 100 described above. In particular, flexible manufacturing system 1300 may include printing system 104, transfer system 120 and computing system 106. Furthermore, as with the previous embodiments, flexible manufacturing system 1300 may be configured for use with article of footwear 102.

In contrast to the previous embodiments, however, flexible manufacturing system 1300 provides a substantially different arrangement for projection system 1314. In one embodiment, projection system 1314 comprises projector 1316 that may be disposed above printing system 104. Additionally, in some embodiments, projection system 1314 also includes mirror 1318, which may be mounted to support frame 116 in some cases. Using this particular arrangement, light projected from projector 1316 is reflected at mirror 1318 down to platform 122.

The increased focal length provided in this particular embodiment may improve operation of flexible manufacturing system 1300. For example, the increased focal length for projection system 1314 allows for the projected image to be better aligned on platform 122 without the need to use vertical lens shift, which can decrease the sharpness of an image. Improving sharpness of a projected image or graphic may improve the accuracy of alignment between projection system 1314 and printing system 104. Furthermore, the focal length of the projection system is increased without increasing the overall dimensions of flexible manufacturing system 1300, whose maximum length may still be approximated by the distance between printing system 104 and platform 122 and whose maximum height may still be approximated by the height of support frame 116.

Although a particular relative position for projector 1316 and mirror 1318 are shown here, it should be understood that these relative positions could vary in any desired manner in other embodiments. For example, projection system 1314 could be disposed behind printing system 104. Additionally, the distance between projector 1316 and mirror 1318, as well as the distance between mirror 1318 and platform 122 could vary according to the desired focal length, for example.

A flexible manufacturing system can include provisions for limiting the movement of an article during the customization process. In some embodiments, the platform onto which an article is placed may not move. Instead, in some embodiments, a printing system may be configured to move between an inactive position and an active position as the flexible manufacturing system proceeds from an alignment stage to a printing stage.

Figure 15:
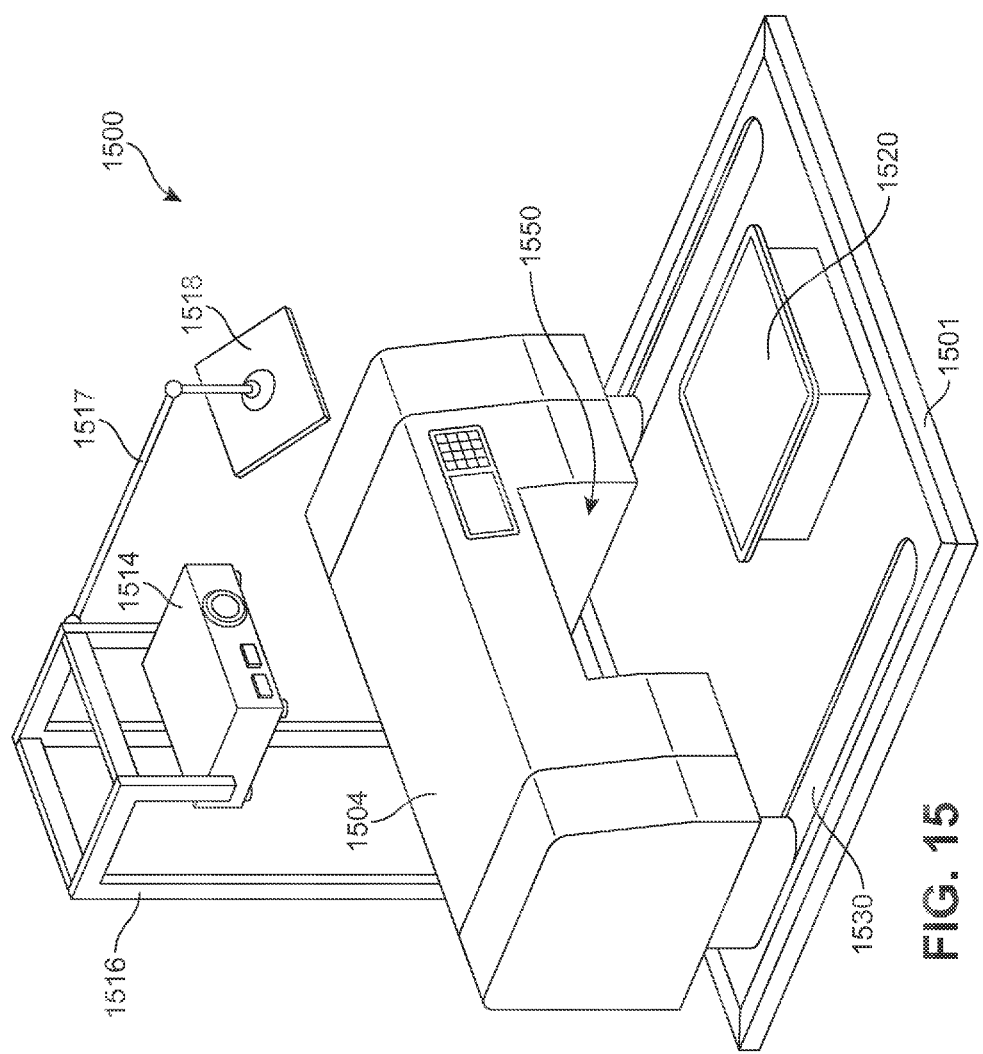
FIG. 15 is a schematic isometric view of another embodiment of a flexible manufacturing system with a printer in a first position.
Figure 16:
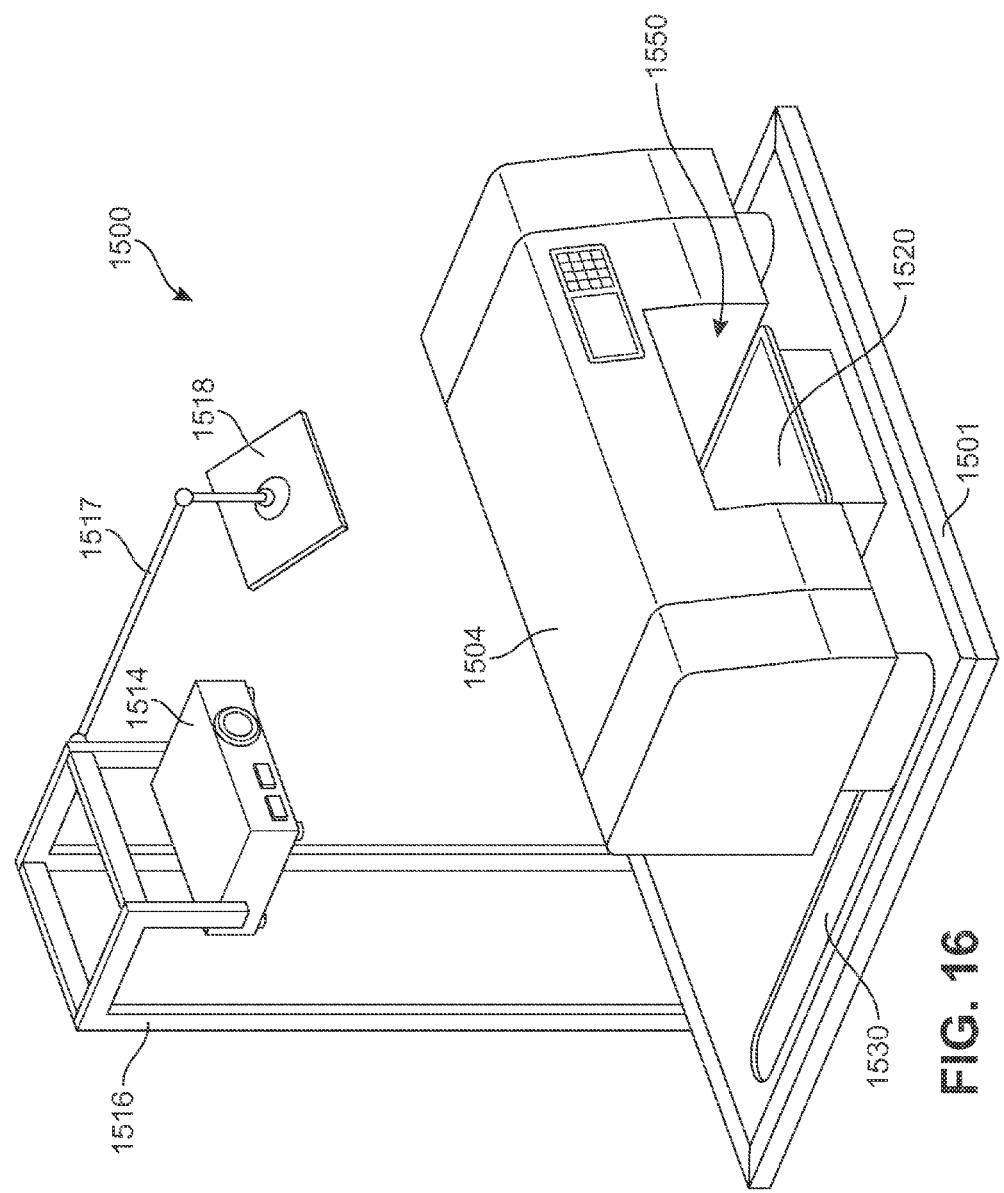
FIG. 16 is a schematic isometric view the flexible manufacturing system of FIG. 15 in which the printer is in a second position.

FIGS. 15 and 16 illustrate schematic views of another embodiment of a flexible manufacturing system 1500, in which a printing system is capable of moving to various positions. Referring to FIGS. 15 and 16, flexible manufacturing system 1500 includes base portion 1501 printing system 1504, alignment system 1512 and stationary platform 1520. Base portion 1501 may comprise a substantially flat surface for mounting one or more components of flexible manufacturing system 1500. Additionally, in some embodiments, stationary platform 1520 comprises a surface for receiving one or more articles. In some cases, stationary platform 1520 is fixed approximately in place on base portion 1501, in contrast to the movable platform 122 of the previous embodiments.

Flexible manufacturing system 1500 can also include a support frame 1516, which may be used to mount projection system 1514. In some cases, support frame 1516 could be attached directly to base portion 1501. In other cases, however, support frame 1516 may be independent of base portion 1501 and the position of support frame 1516 may be adjusted in relation to base portion 1501. Support frame 1516 may be further associated with mounting arm 1517 that extends outwardly from support frame 1516 and further supports mirror 1518. As seen in FIG. 15, this arrangement allows images projected from projection system 1514 to be projected onto stationary platform 1520 (and onto any objects and/or articles disposed on stationary platform 1520).

In some embodiments, printing system 1504 may be mounted to tracks 1530 of base portion 1501. In some cases, printing system 1504 is mounted in a movable manner to base portion 1501, so that printing system 1504 is capable of sliding along tracks 1530. This allows printing system 1504 to move between a first position (seen in FIG. 15) and a second position (seen in FIG. 16). In other words, in this embodiment, alignment of a graphic on an article may be done while printing system 1504 is in the first, or inactive, position. With printing system 1504 in this inactive position, printing system 1504 is disposed away from stationary platform 1520 and does not interfere with the projection of images by projection system 1514. Once the graphic alignment has been completed, printing system 1504 could be moved to the second, or active, position. In this active position, printing system 1504 may be disposed directly over stationary platform 1520 and may be configured to print a graphic onto an article that may be disposed on stationary platform 1520. In some cases, to help provide clearance for any article disposed on stationary platform 1520, printing system 1504 can be configured with printing bay portion 1550.

A flexible manufacturing system may include provisions for aligning graphics on an article in a manner that minimizes calibration requirements. In some embodiments, a flexible manufacturing system may include a transparent display device that can display graphics for alignment on an article.

Figure 17:
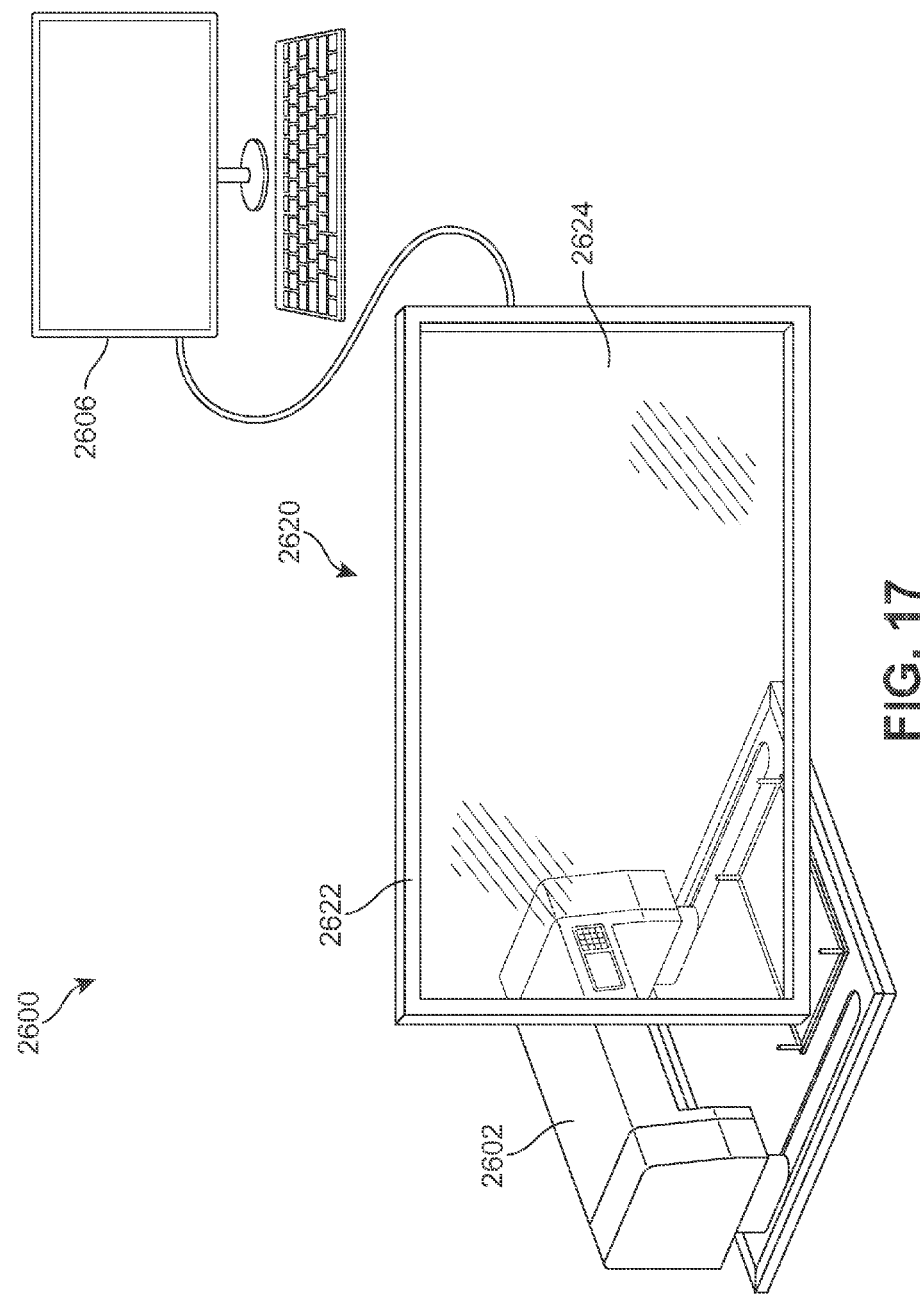
FIG. 17 is a schematic isometric view of an embodiment of a flexible manufacturing system including a display device for aligning images or graphics with an article.
Figure 18:
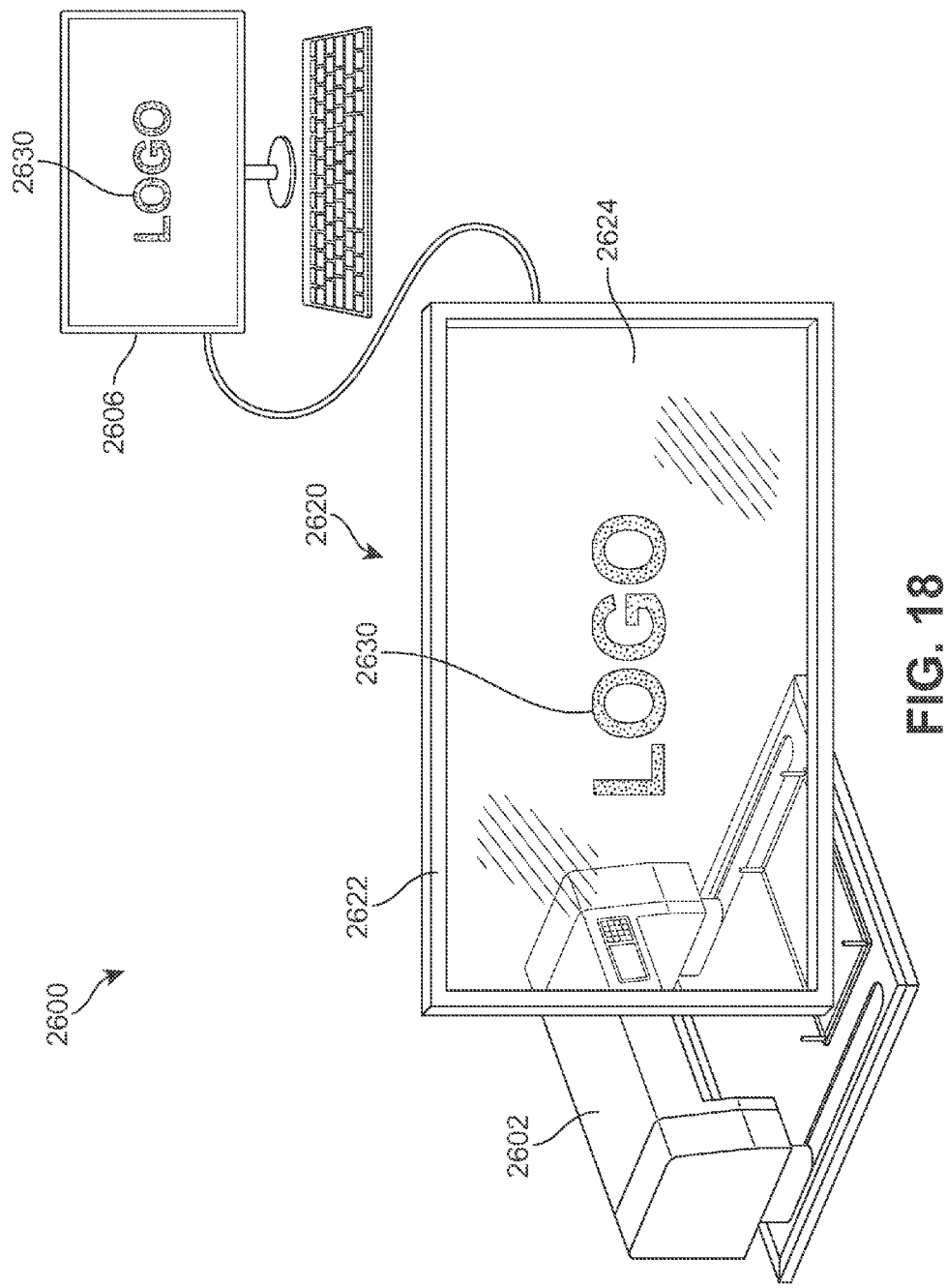
FIG. 18 is a schematic isometric view of the flexible manufacturing system of FIG. 17, in which a logo graphic is displayed on the display device.

FIGS. 17 and 18 illustrate schematic views of some components of a flexible manufacturing system 2600, also referred to simply as system 2600. Referring to FIGS. 17 and 18, system 2600 may include printing system 2602, computing system 2606 as well as additional provisions and features, some of which are discussed in further detail below. Additionally, system 2600 may include display device 2620 that communicates with computing system 2606 via a wired and/or wireless connection.

Display device 2620 may be further configured with an outer frame portion 2622 that houses a screen portion 2624. As seen in FIGS. 17 and 18, in some embodiments, screen portion 2624 is substantially transparent. This allows a viewer to see through screen portion 2624.

Display device 2620 may be further configured to display one or more graphics on screen portion 2624. In the current embodiment, for example, display device 2620 receives information from computing system 2606 and displays logo graphic 2630 in a central portion of screen portion 2624. This may allow a viewer to see various graphics superimposed over real-world objects (such as an article) when the objects are viewed through display device 2620. In particular, this arrangement allows a graphic to be superimposed, and therefore aligned, over an article, in order to align the image for printing. Details of this method are discussed in further detail below.

Display device 2620 may be any kind of device capable of displaying graphics and/or images. Generally, display device 2620 may utilize any display technology capable of displaying images on a transparent or semi-transparent screen. Some embodiments could make use of heads-up-display (HUD) technologies, which display images on a transparent screen using, for example, CRT images on a phosphor screen, optical waveguide technology, scanning lasers for displaying images on transparent screens as well as solid state technologies such as LEDs. Examples of solid state technologies that may be used with display device 2620 include, but are not limited to liquid crystal displays (LEDs), liquid crystal on silicon displays (LCoS), digital micro-mirrors (DMD) and organic light emitting diodes (OLEDs). The type of display technology used may be selected according to various factors such as display size, weight, cost, manufacturing constraints (such as space requirements), degree of transparency as well as possibly other factors.

Although some embodiments may use screens that are substantially transparent, other embodiments may use screens that are only partially transparent or translucent. The degree of transparency required may vary according to manufacturing considerations such as lighting conditions, manufacturing costs, and precision tolerances for alignment.

Figure 19:
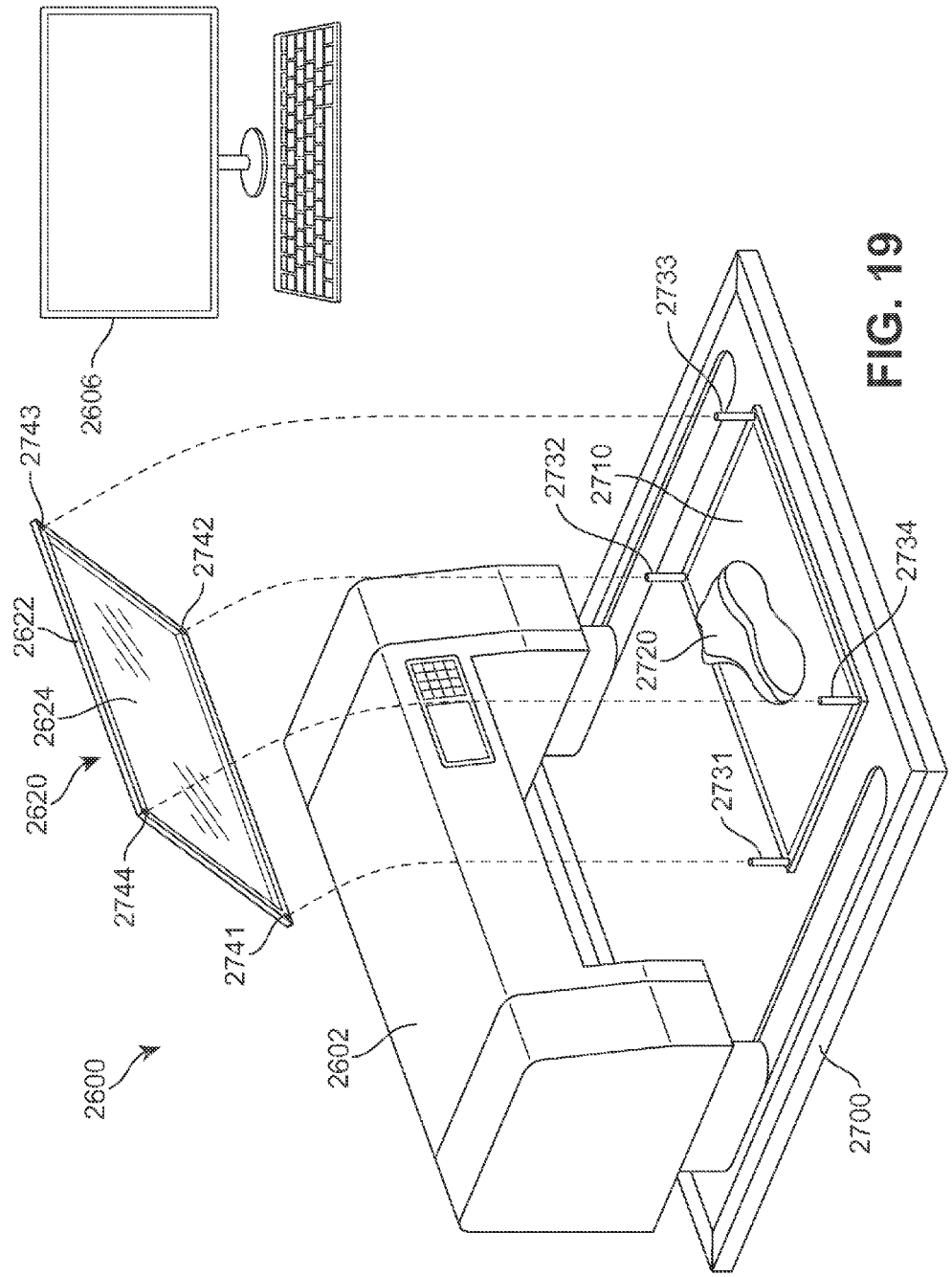
FIG. 19 is a schematic isometric view of the flexible manufacturing system of FIG. 17, in which the display device is associated with posts of a platform.
Figure 20:
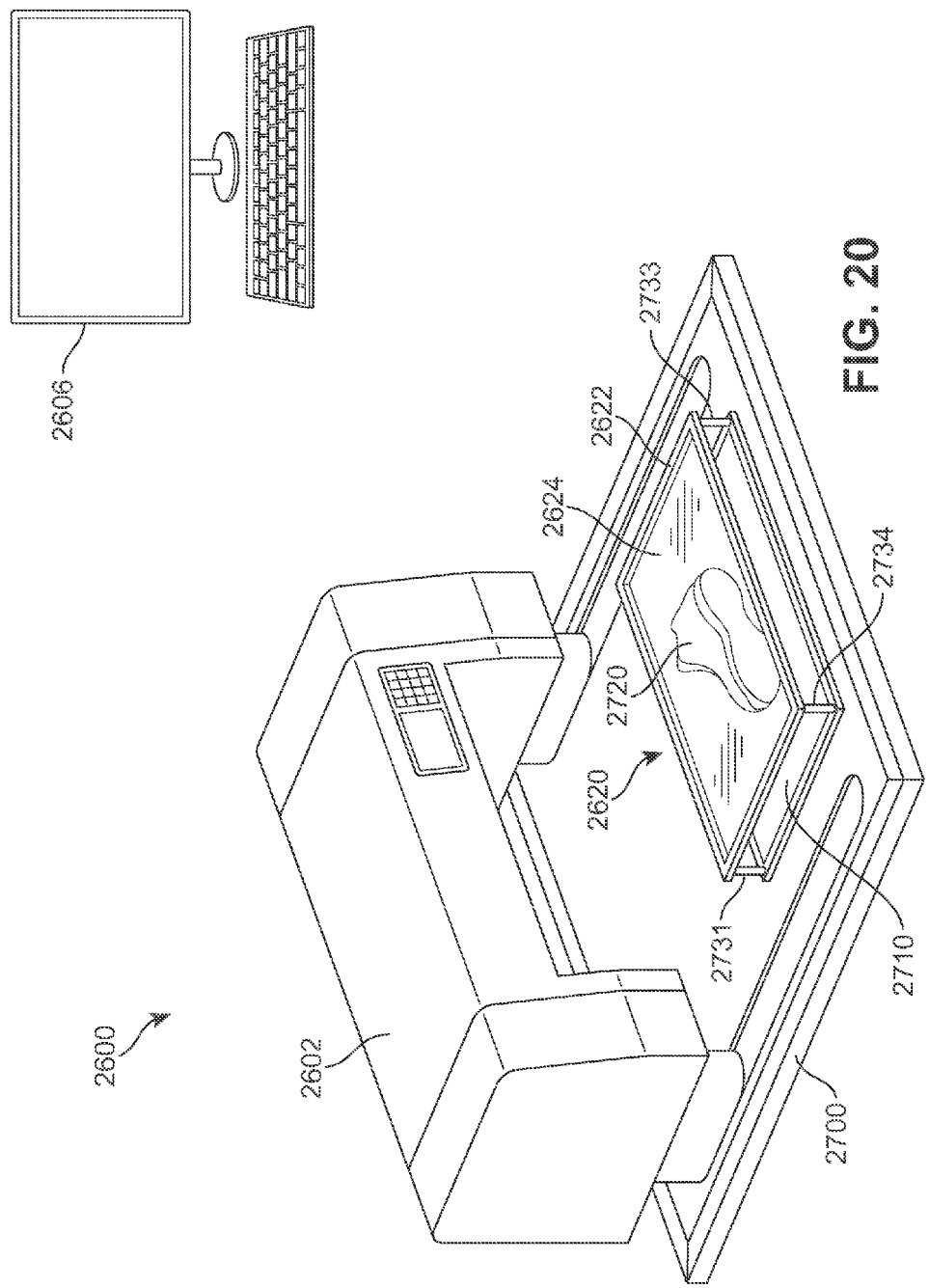
FIG. 20 is a schematic isometric view of the flexible manufacturing system of FIG. 17, in which the display device is mounted over a platform.

FIGS. 19 and 20 illustrate schematic isometric views of flexible manufacturing system 2600, which further highlight the attachment of display device 2620 with other components of system 2600. Referring first to FIG. 19, base portion 2700 of system 2600 may include platform 2710 that is configured to receive an article 2720 for alignment and printing. In order to superimpose a graphic over article 2720, system 2600 is configured with provisions for mounting display device 2620 at a predetermined height above platform 2710. In particular, platform 2710 is further associated with one or more mounting posts including, for example, a first mounting post 2731, a second mounting post 2732 a third mounting post 2733 and a fourth mounting post 2734. Each mounting post may be configured to engage corresponding recesses in display device 2620. In particular, for example, first mounting post 2731, second mounting post 2732, third mounting post 2733 and fourth mounting post 2734 may be associated with, and inserted into, first recess 2741, second recess 2742, third recess 2743 and fourth recess 2744, respectively, of outer frame portion 2622. This arrangement allows display device 2620 to be mounted over platform 2710, as shown in FIG. 20, so that a graphic displayed on screen portion 2624 may be superimposed over article 2720.

Although the current embodiment illustrates four posts for attaching and aligning display device 2620 with platform 2710, other embodiments could include any other number of mounting posts as well as any other kind of mounting structures. Moreover, in some embodiments supporting features may be used in conjunction with separate alignment features. For example, some embodiments could use four posts for supporting display screen 2620, and two or more alignment pins that ensure that display screen 2620 is properly aligned over platform 2710.

In order to ensure that a printer can associate with a surface of an article, a display device can be removably fastened or mounted to base portion 2700. In one embodiment, for example, display device 2620 is configured to rest on mounting posts or other support structures in a manner that restricts horizontal movement but allows for display device 2620 to be easily lifted off the mounting posts or support structures. In other embodiments, display device 2620 could include fastening systems for temporarily securing display device 2620 to base portion 2700.

Figure 21:
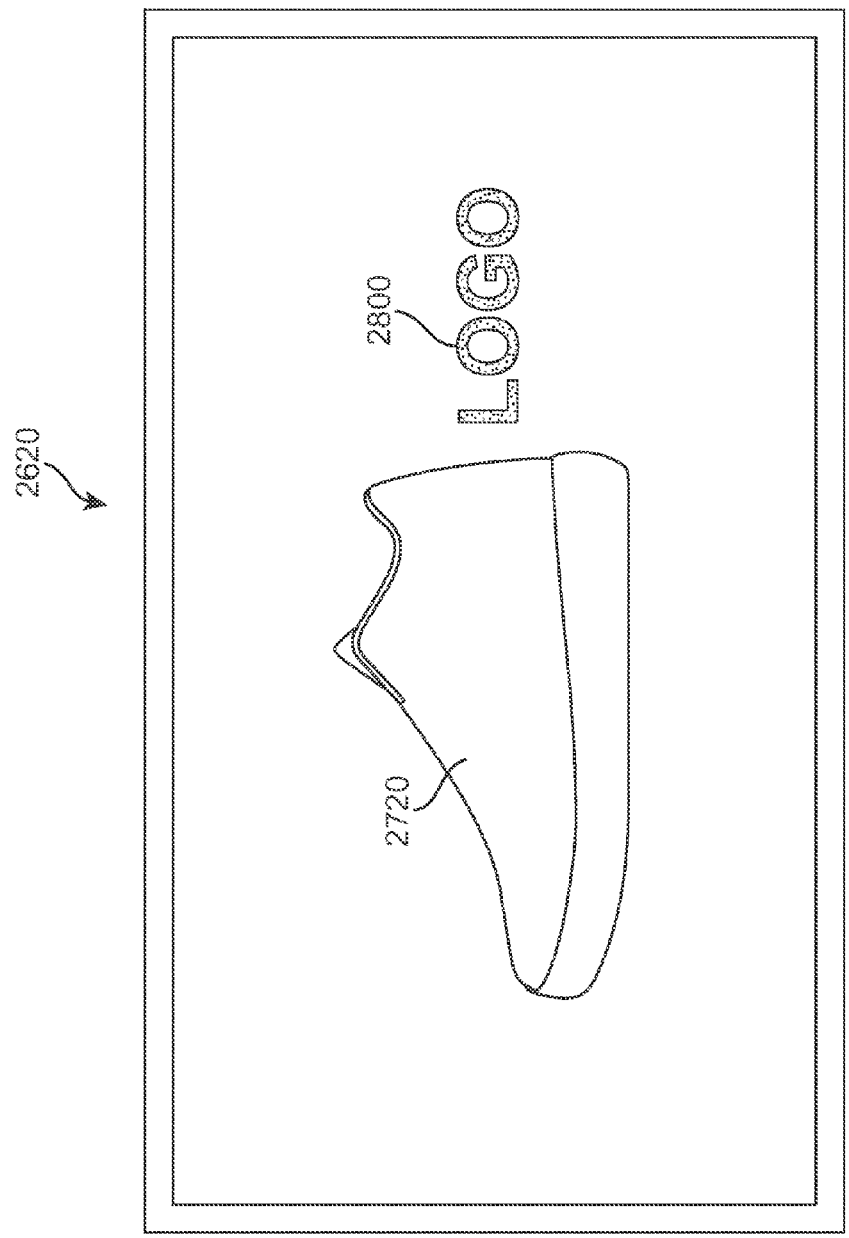
FIG. 21 is a schematic top down view of a display device and an article beneath the display device, in which a logo graphic is displayed on the display device.
Figure 22:
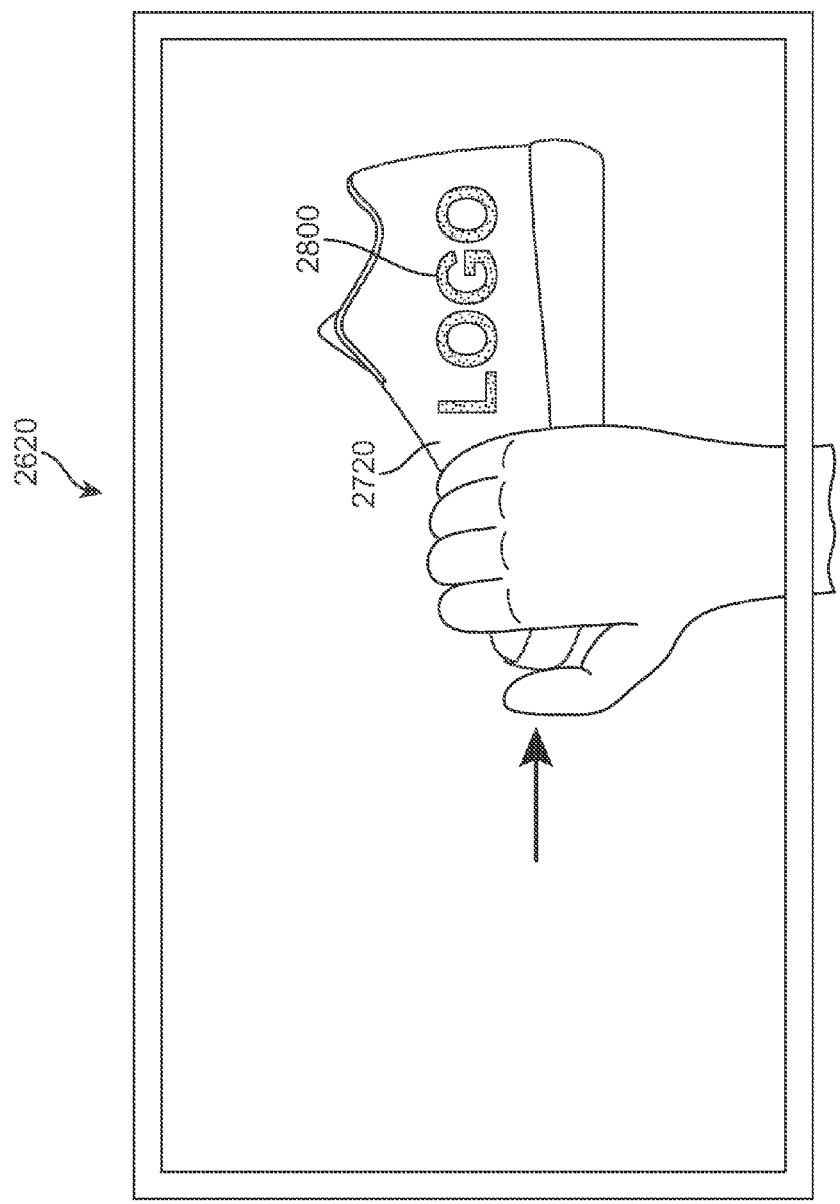
FIG. 22 is a schematic top down view of the display device and article of FIG. 21, in which the article is moved under the display screen to align the logo graphic with the article.
Figure 23:
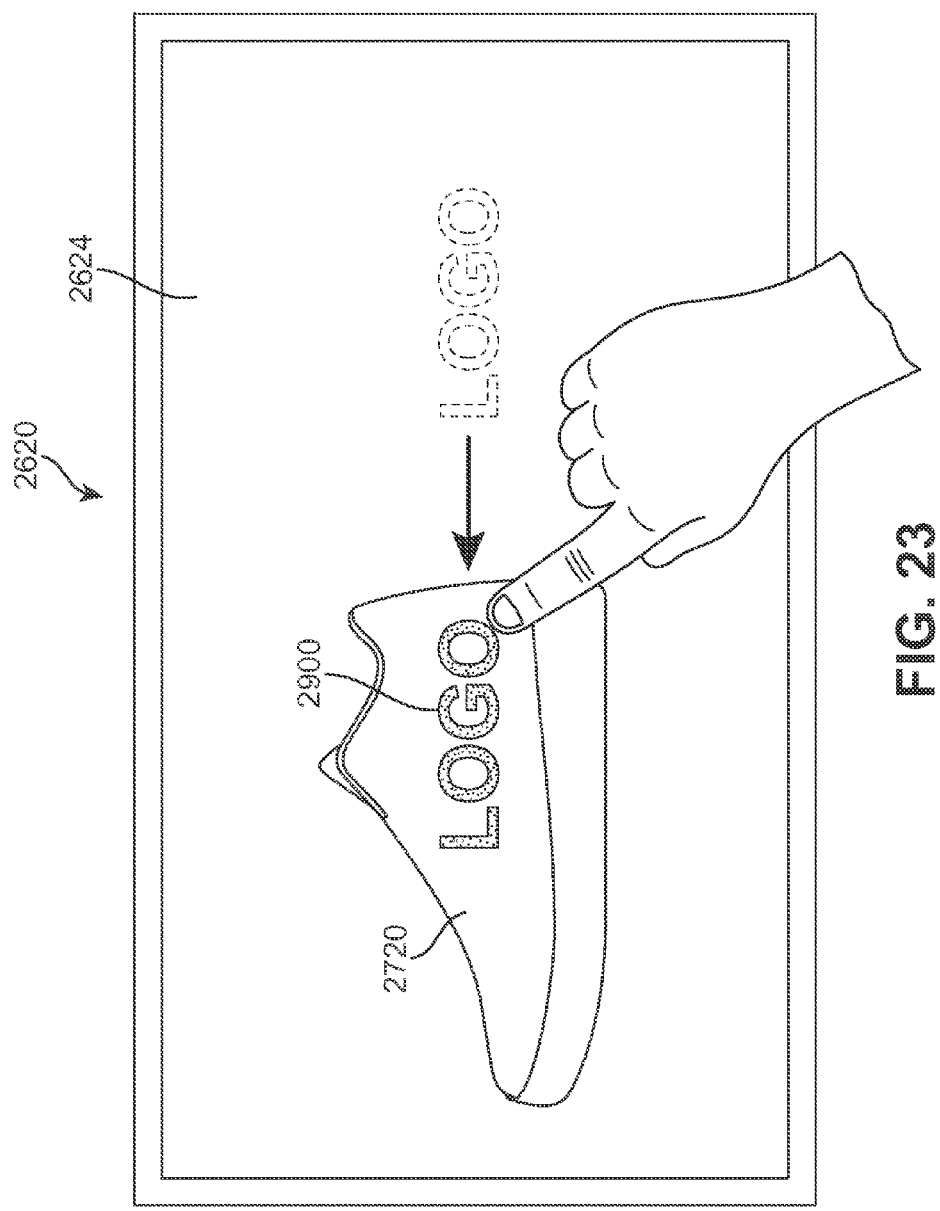
FIG. 23 is a schematic top view of a display device and an article beneath the display device, in which a user adjusts the position of a logo graphic in order to align the graphic with the article.

FIGS. 21 through 23 illustrate various methods for aligning a graphic on an article. Referring first to FIGS. 21 and 22, in some embodiments graphic 2800 may be displayed on a fixed location of display device 2620. In this case, to align graphic 2800 over the desired location of article 2720, a user may move the position of article 2720 to achieve the desired alignment between graphic 2800 and article 2720. Thus for example, a user can slide article 2720 into the desired relative position as seen in FIG. 22 in order to achieve the desired alignment.

In still other embodiments, the position of graphic 2800 may be adjusted in order to achieve the desired alignment. For example, FIG. 23 illustrates a situation where article 2720 stays in place while graphic 2900 is translated across screen portion 2624. The position of graphic 2900 may be changed using any desired technology, including, for example, touch-screen technology. In other words, in some cases a user may touch graphic 2900 on display device 2620 and slide graphic 2900 into the desired location for alignment with article 2720. In other embodiments, a user could adjust the relative location of graphic 2900 on display device 2620 using computing device 2602 (see FIG. 20), a remote device or any other method known for controlling the positions of graphics on a display.

Figure 24:
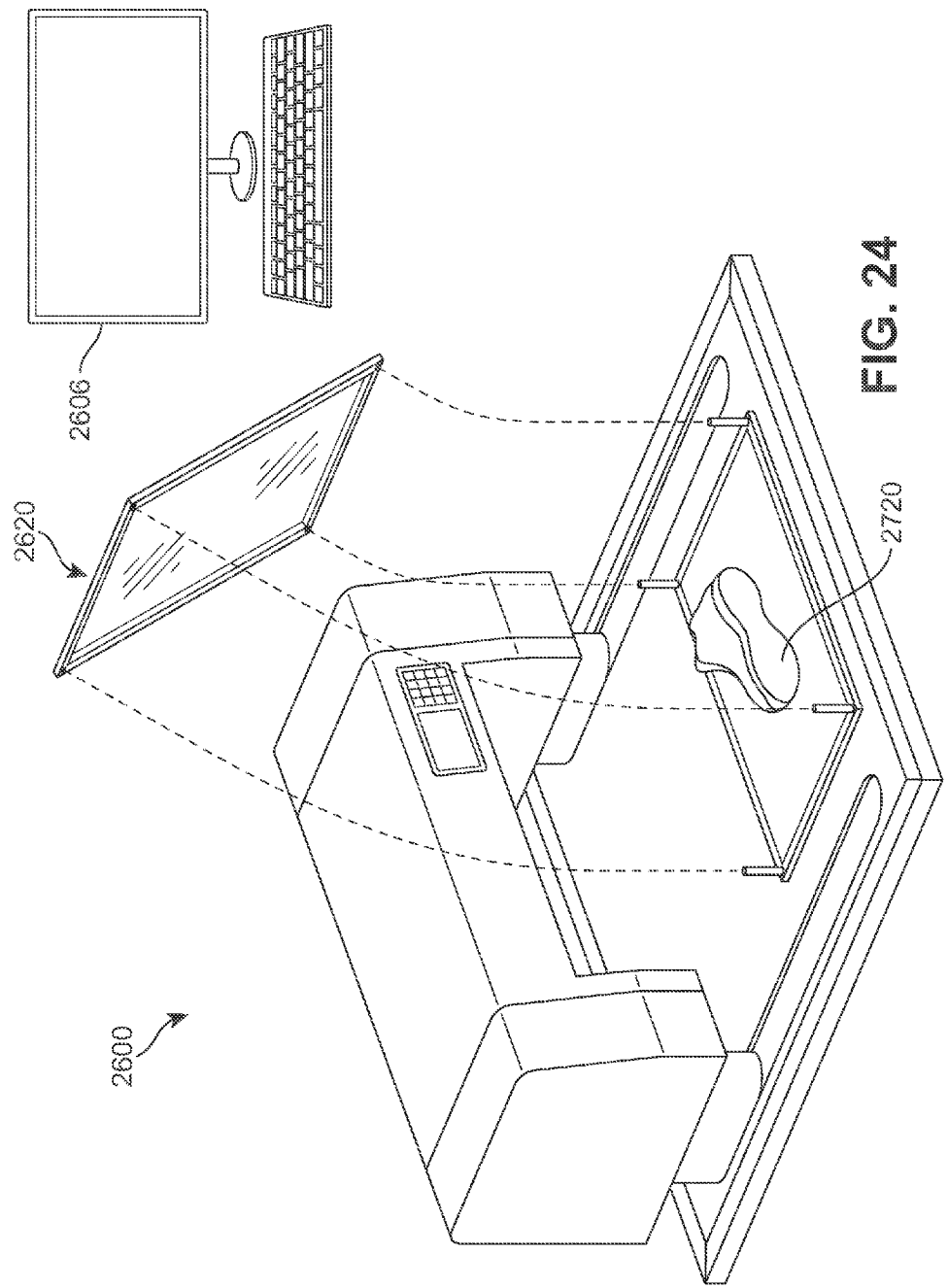
FIG. 24 is a schematic isometric view of an embodiment of a flexible manufacturing system, in which a display device is removed from a platform.
Figure 25:
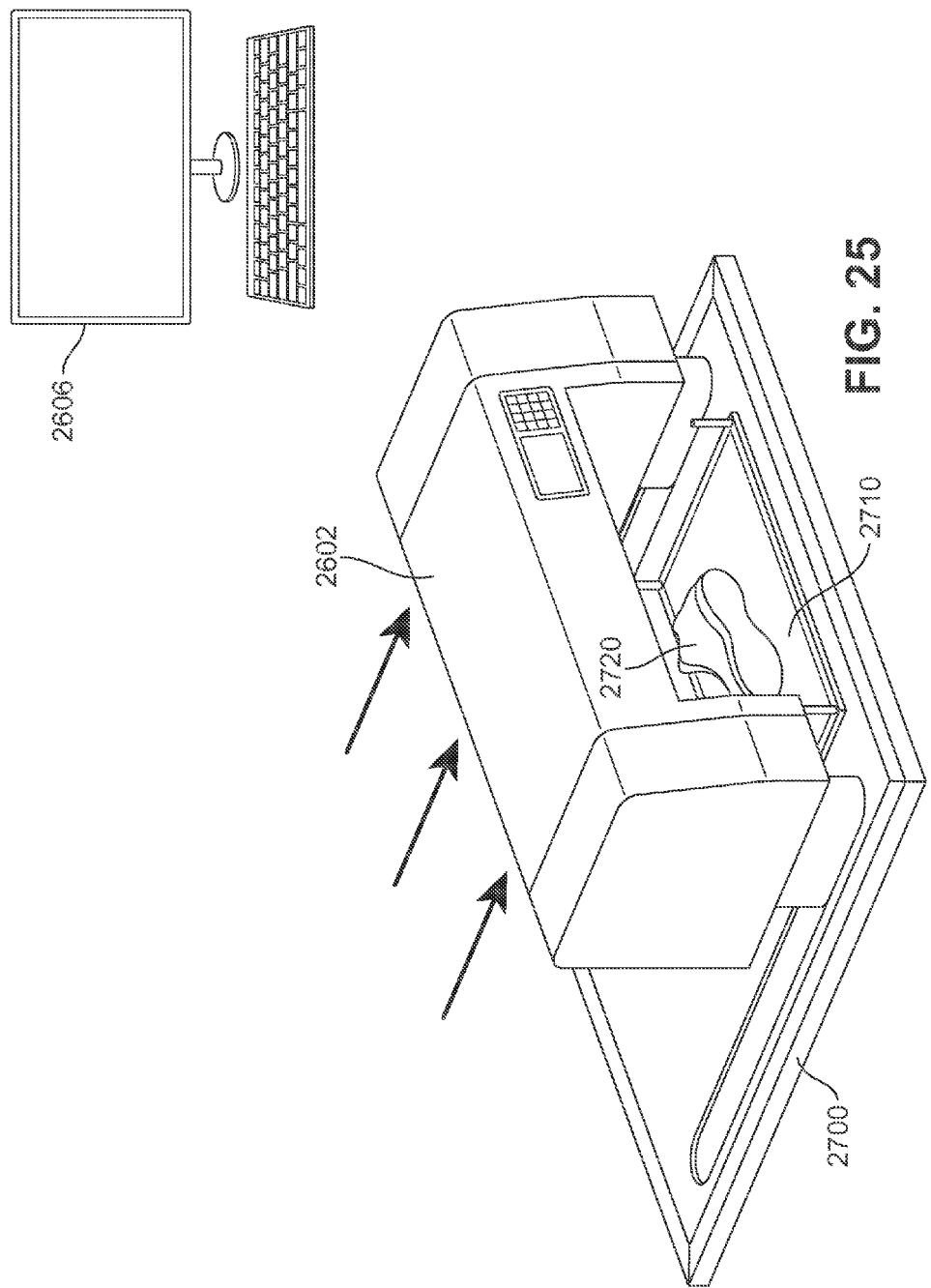
FIG. 25 is a schematic isometric view of the flexible manufacturing system of FIG. 24, in which a printing system is moved into a position for printing onto an article.
Figure 26:
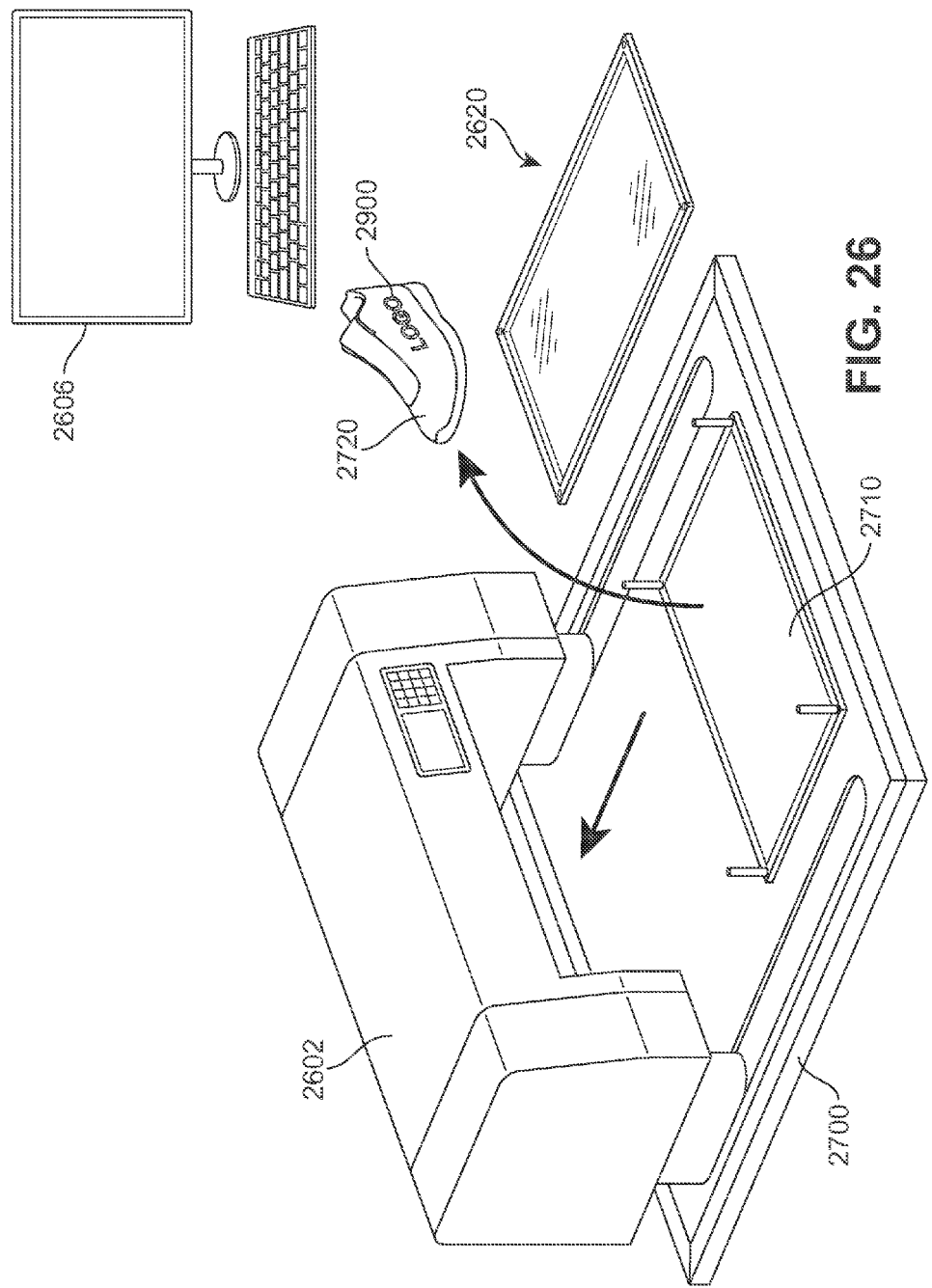
FIG. 26 is a schematic isometric view of the flexible manufacturing system of FIG. 24, in which a graphic has been printed onto an article.

FIGS. 24 through 26 illustrate further steps in the process of applying a graphic to an article, once the graphic has been aligned in a desired location on the article using the methods described above. Referring now to FIGS. 24 through 26, with the desired alignment achieved between graphic 2900 (see FIG. 23) and article 2720, a user can separate display device 2620 from base portion 2700. In some cases, display device 2620 may be lifted from its engagement with one or more posts or similar mounting provisions, as seen in FIG. 24. Next, as seen in FIG. 25, printing system 2602 may be moved to a position over platform 2710 and article 2720. Printing system 2602 may be calibrated with display device 2620 so that printing system 2602 is configured to print graphic 2900 at the same location over article 2720 which graphic 2900 was displayed using display device 2620. As seen in FIG. 26, graphic 2900 has been printed at the desired location on article 2720 using printing system 2602.

As discussed above, display device 2620 and printing system 2602 may be calibrated prior to aligning and printing a graphic to an article. In one possible method of calibration, printing system 2602 could print a test graphic, such as an alignment grid or other pattern, onto a sheet of paper positioned on platform 2710 or onto a test panel temporarily installed on mounting posts to achieve the same relative height between printing system 2602 and display device 2620. The printed test pattern could then be placed directly under display device 2620 so that the position of an identical test graphic could be superimposed and repositioned until the two test graphics coincide.

The embodiments discussed here and shown in FIGS. 17 through 26, for example, may be generally characterized as methods and systems for aligning images or graphics with an article prior to printing to the article. For example, the method generally involves of aligning a graphic on the article while the article and a printing system are in a first relative configuration. As seen for example in FIG. 20, such a first relative configuration may be on where printing system 2602 cannot print onto article 2720, since printing system 2720 is not in a print-ready state (i.e., printing system 2720 is no disposed over article 2720). The method further involves changing the relative configuration of the article and the printing system from the first relative configuration to a second relative configuration, where the second relative configuration is substantially different from the first relative configuration. In this case, the second relative configuration is one where printing system 2602 can print onto article 2720, as printing system 2602 is in a print ready position (i.e., disposed over article 2720 and platform 2710). Moreover, the methods described here generally include printing a printed graphic onto the article while the article and the printing system are in the second relative configuration and/or the print ready configuration.

Figure 27:
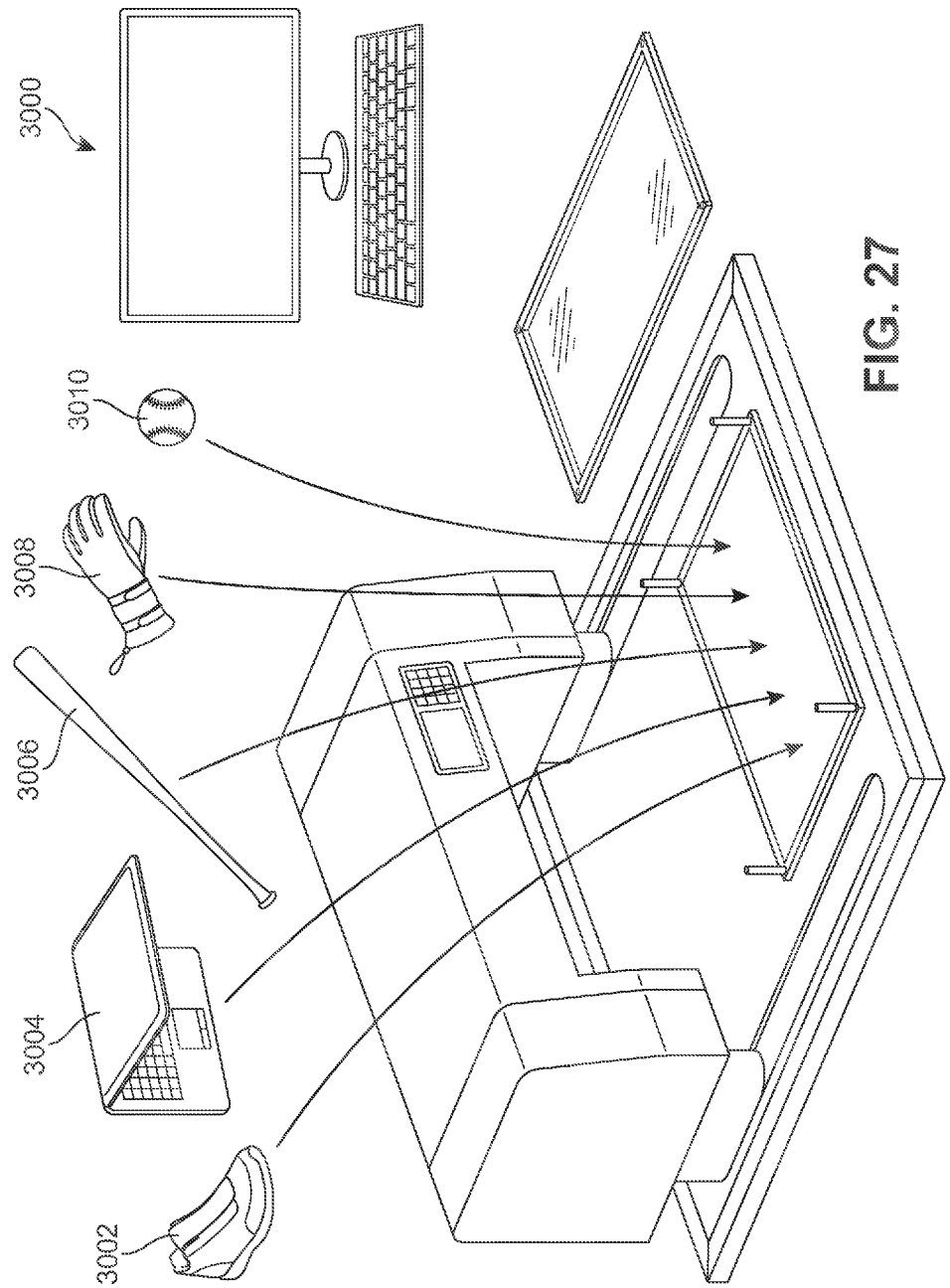
FIG. 27 is a schematic isometric view of an embodiment of a flexible manufacturing system including a variety of different items that can be used with the system.

As already discussed, the flexible manufacturing system described here for printing graphics to articles may be used with any kind of articles or objects and in particular the method and systems described here are not limited to use with articles of footwear and/or apparel. FIG. 27 illustrates a schematic view of a flexible manufacturing system 3000 that can be used to print graphics directly to various kinds of objects, including, for example, an article of footwear 3002, a laptop computing device 3004, a bat 3006, a glove 3008 and a softball 3010. Furthermore, as previously stated the flexible manufacturing system may be used with articles that are configured to be worn include, but are not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment. Additionally, in some embodiments, the flexible manufacturing system could be used with balls, bags, purses, backpacks, luggage, computers (including laptops, tablet computers and smartphone devices), cell phones, as well as other electronic devices and hard goods. Other examples of articles could include various sporting equipment including, for example, protective gear (shin guards, wrist guards, knee pads, elbow pads, etc.), balls (baseballs, softballs, basketballs, soccer balls, footballs, golf balls, etc.) as well as any other kinds of sporting equipment.

It should be further understood that the processes and systems described here are not limited to applications of graphics or other decorative elements. In particular, some embodiments may be configured to apply functional elements through known printing processes for constructing functional elements on articles or other components. As one possible example of a situation where functional elements can be printed to an article using a flexible manufacturing system, FIGS. 28 through 31 illustrate an embodiment in which two distinct functional elements are aligned with desired regions of an article and printed onto the article.

Figure 28:
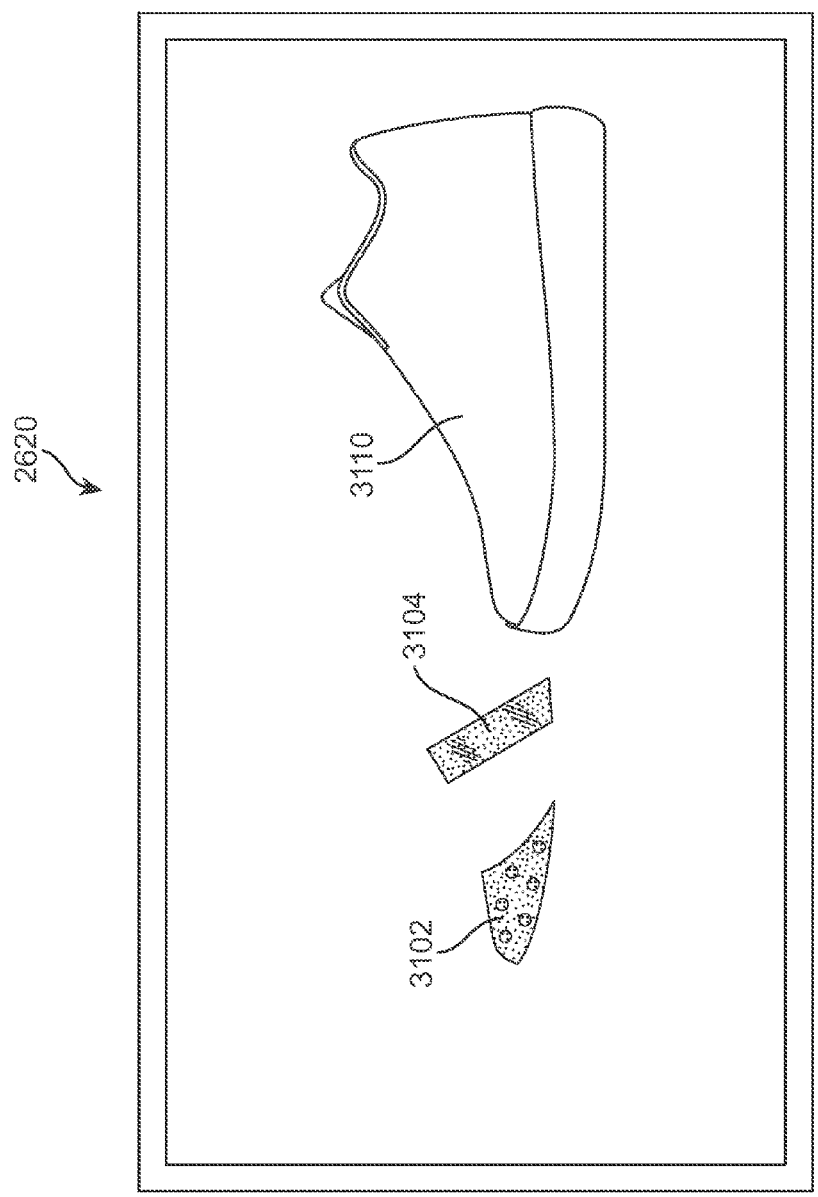
FIG. 28 is a top down schematic view of an embodiment of a display device, an article beneath the display device and two functional elements displayed on a display device.
Figure 29:
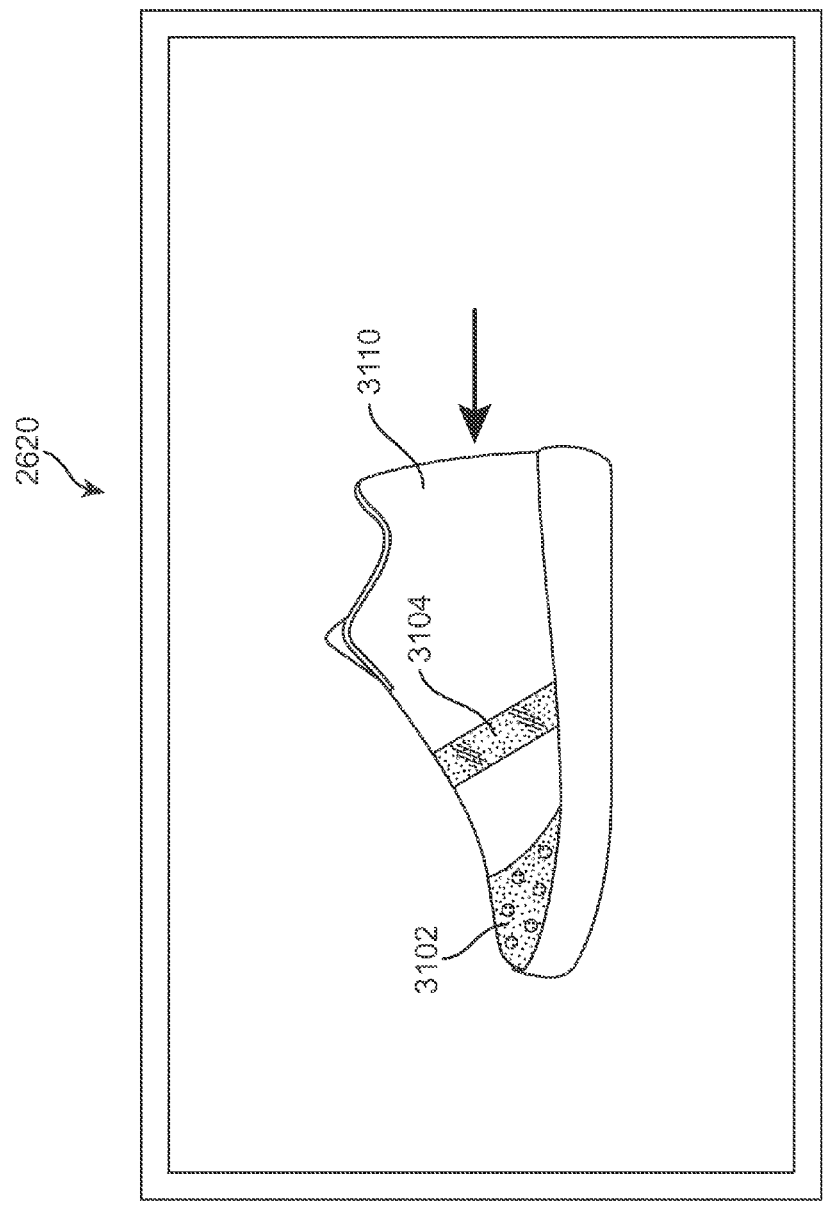
FIG. 29 is a schematic top down view of the components of FIG. 28, in which the functional elements have been aligned over corresponding portions of the article.
Figure 30:
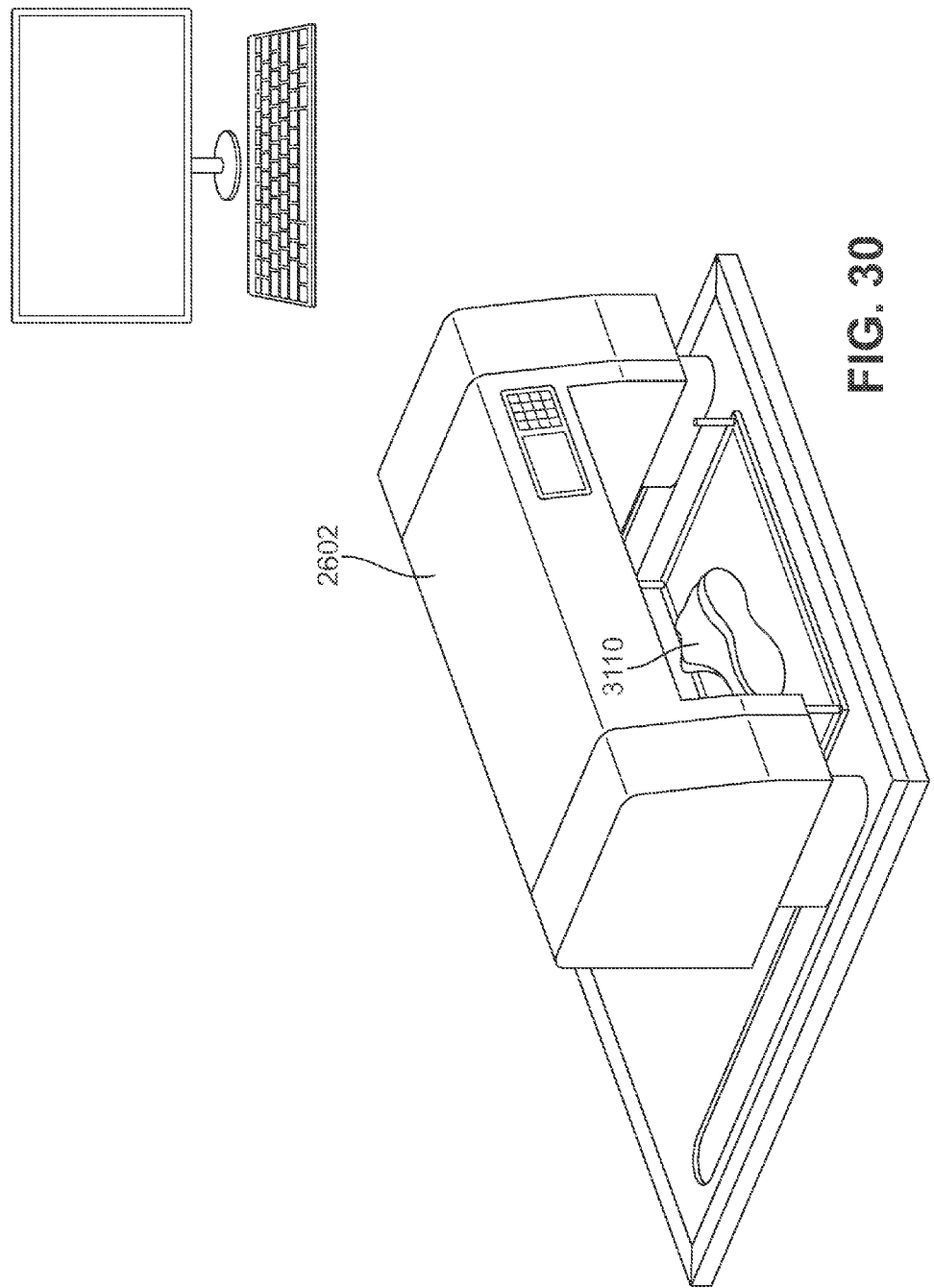
FIG. 30 is a schematic isometric view of a printing system in position to print functional elements onto an article.
Figure 31:
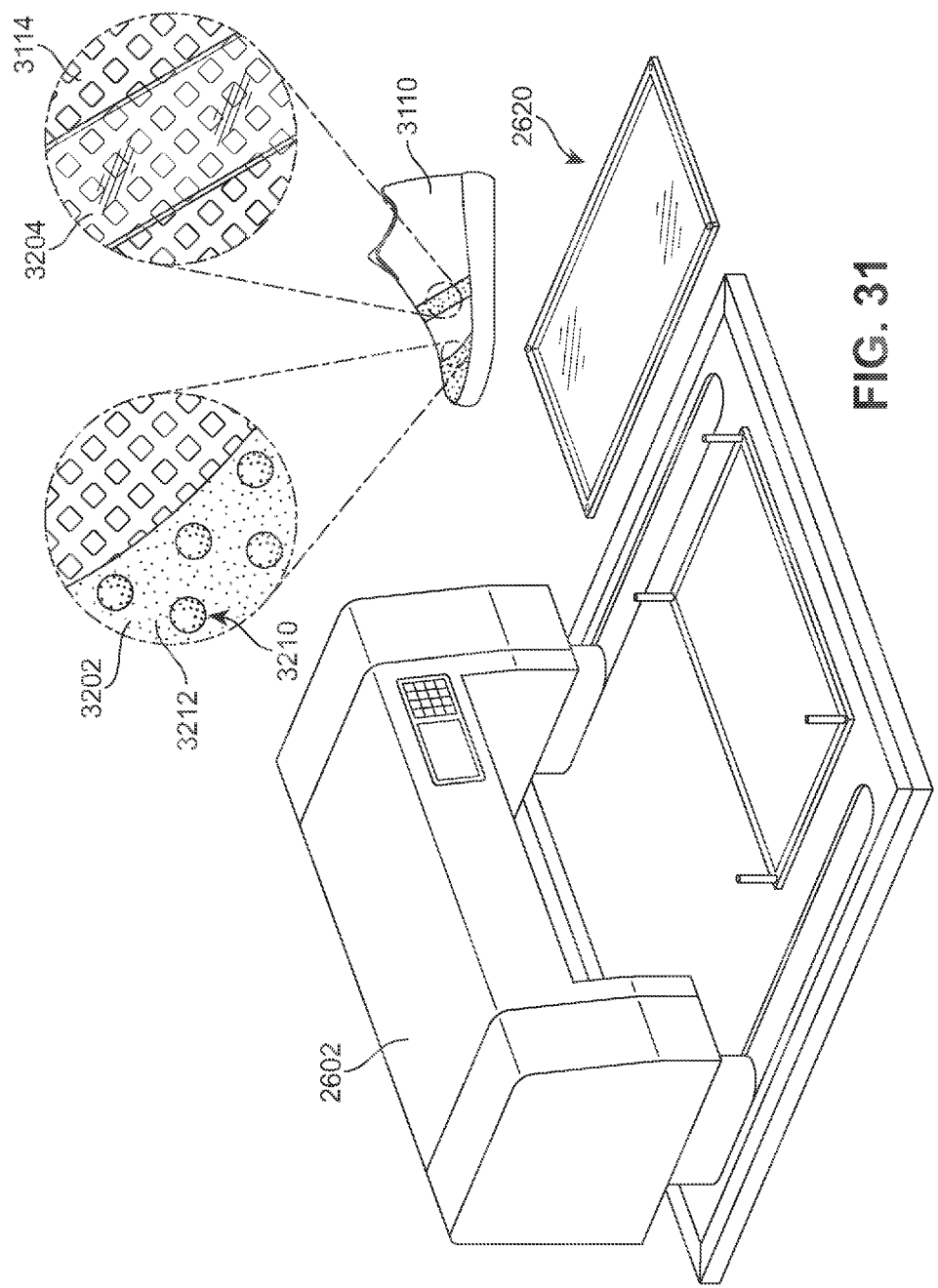
FIG. 31 is a schematic isometric view of an article with functional elements that have been applied using a flexible manufacturing system.

Referring now to FIGS. 28 and 31, first functional graphical element 3102 and second functional graphic element 3104 may be displayed on display device 2620, for the purposes of superimposing element 3102 and element 3104 over article 3110. As seen in FIG. 29, the position of article 3110 may be adjusted so that first functional graphic element 3102 and second functional graphic element 3104 are aligned over the desired regions or locations of article 3110. Once the desired alignment has been achieved, first functional graphic element 3102 and second functional graphic element 3104 can be printed onto article 3110 using printing system 2602, as seen in FIG. 30. The resulting article includes first functional printed element 3202 and second functional printed element 3204, as seen in FIG. 31. In this exemplary embodiment, first functional printed element 3202 comprises a plurality of hemispheric portions 3210 emerging from a base layer 3212, which may provide some extra durability and/or traction for a toe portion of article 3110. Second functional printed element 3204 may comprise a waterproof transparent layer that helps to protect the underlying portions of upper 3114.

In order to achieve functional elements, printing system 2602 may be modified in any manner so that material printed onto an article adds functionality and not just aesthetics or decorative elements to an article. For example, printing system 2602 can be modified to print multiple layers of ink, which may build up to form structural layers having varying types of material characteristics. In some embodiments, printing system 2602 may be configured to print any other kinds of materials besides inks, including, for example, various polymer materials that are commonly used in additive manufacturing processes.

Examples of further features that could be applied to an article using a printing system include, but are not limited to: traction features, durability features, texture-based features, as well as any other kinds of features that could be applied to an article using a printing system. Some embodiments may use one or more features, techniques, methods, systems, devices or printed layers disclosed in Jones, U.S. Pat. No. 8,993,061, U.S. patent application Ser. No. 13/553,348, filed Jul. 19, 2012, and titled "Direct Printing to Fabric," as well as in Jones, U.S. Pat. No. 9,005,710, U.S. patent application Ser. No. 13/553,368, filed Jul. 19, 2012, and titled "Footwear Assembly Method with 3D Printing," the entirety of both of which being hereby incorporated by reference.

The various flexible manufacturing systems described in these embodiments can be used in conjunction with other systems that may improve manufacturing efficiency. As an example, some embodiments could make use of one or more remote devices that may be used to operate one or more devices of the systems described here. In one possible embodiment, a touchpad type remote device may be used to control an alignment device such as a projection system and/or display device. Such a remote device is described in Miller, U.S. Pat. No. 8,978,551, U.S. patent application Ser. No. 13/557,963, filed Jul. 25, 2012, and titled "Projection Assisted Printer Alignment Using Remote Device," the entirety of which is herein incorporated by reference.

Embodiments can include provisions to improve the precision of alignment between a displayed graphic and an article of footwear. In some embodiments, a flexible manufacturing system can include provisions to maintain a consistent viewing angle of a displayed graphic superimposed onto an article beneath a display device, which may help improve alignment precision.

Figure 32:
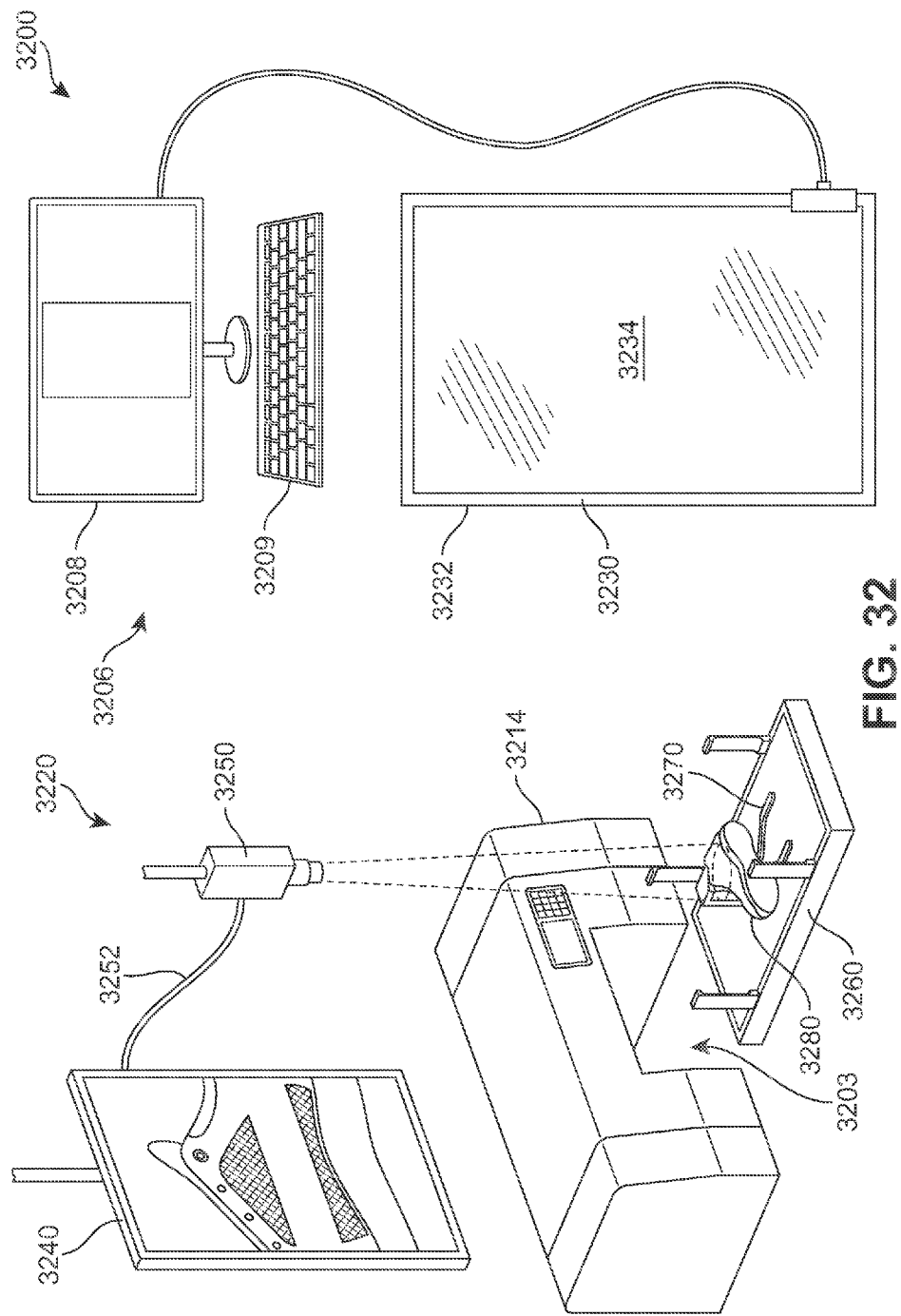
FIG. 32 is a schematic view of another embodiment of a flexible manufacturing system using two display devices.

FIG. 32 illustrates a schematic view of some components of a flexible manufacturing system 3200, also referred to simply as system 3200. Referring to FIG. 32, system 3200 may include printing system 3214, an alignment system 3220 and a computing system 3206 as well as additional provisions and features, some of which are discussed in further detail below.

Flexible manufacturing system 3200 may comprise various provisions that are useful in printing a graphic directly to an article. In some embodiments, flexible manufacturing system 3200 may include printing system 3214. Printing system 3214 may comprise one or more individual printers. Although a single printer is illustrated in FIG. 32, other embodiments could incorporate two or more printers that may be networked together.

Printing system 3214 may utilize various types of printing techniques. These can include, but are not limited to: toner-based printing, liquid inkjet printing, solid ink printing, dye-sublimation printing, inkless printing (including thermal printing and UV printing), MEMS jet printing technologies as well as any other methods of printing. In some cases, printing system 3214 may make use of a combination of two or more different printing techniques. The type of printing technique used may vary according to factors including, but not limited to: material of the target article, size and/or geometry of the target article, desired properties of the printed image (such as durability, color, ink density, etc.) as well as printing speed, printing costs and maintenance requirements.

In one embodiment, printing system 3214 may utilize an inkjet printer in which ink droplets may be sprayed onto a substrate, such as the medial or lateral side panel of a formed upper. Using an inkjet printer allows for easy variation in color and ink density. This arrangement also allows for some separation between the printer head and the target object, which can facilitate printing directly to objects with some curvature and/or surface texture.

In some embodiments, printing system 3214 may be further associated with a platform 3260, which supports one or more articles for printing. For purposes of illustration, platform 3260 is shown schematically in the embodiments. In some embodiments, platform 3260 may be integrated with printing system 3214. For example, in some cases, platform 3260 may be part of a sliding tray or similar component that can be moved into and out of printing bay 3203. In some cases, platform 3260 may be mounted onto an existing tray or other structure of printing system 3214 intended to support objects for printing.

In other embodiments, however, platform 3260 could be a separate component from printing system 3214 or may not be mounted to a movable component of printing system 3214. In such embodiments, a separate transfer system could be utilized to move platform 3260 into and out of a printing position. In one embodiment, alignment system 3220 may use a transfer system similar to transfer system 120 described above and shown in FIGS. 3 and 4.

Flexible manufacturing system 3200 can include provisions for facilitating the alignment of an article with a printing system. In some embodiments, it may be useful to provide a user with a way of aligning an article with a printing system so as to ensure a graphic is printed in the desired portion of the article. In particular, flexible manufacturing system 3200 may include provisions for aligning an article with a printing system in such a way as to accommodate articles of various types, shapes and sizes.

In some embodiments, flexible manufacturing system 3200 may include alignment system 3220. Alignment system 3220 may be seen to further comprise a first display device

3230, a second display device 3240 and an optical device 3250. As discussed in further detail below the various components of alignment system 3220 allow an article to be properly positioned on platform 3260 to ensure a selected graphic is printed onto the desired location of the article.

As discussed in further detail below, first display device 3230 may facilitate aligning an article with printing system 3214. In particular, first display device 3230 may display one or more images or graphics that can be superimposed over an article that is positioned beneath first display device 3230. Because first display device 3230 (or a region of first display device 3230) may be in one-to-one correspondence with a printable area of printing system 3214 (i.e., first display device 3230 may be registered with the print heads of printing system 3214), aligning the article directly under the displayed graphic ensures that graphic will be printed on the desired location of the article.

In some embodiments, first display device 3230 may be configured with an outer frame portion 3232 that houses a screen portion 3234. In some embodiments, screen portion 3234 is substantially transparent (see FIG. 34). This allows a viewer to see through screen portion 3234 so that the displayed graphic can be superimposed over an article from the viewpoint of a user of flexible manufacturing system 3200.

First display device 3230 may be any kind of device capable of displaying graphics and/or images. Generally, first display device 3230 may utilize any display technology capable of displaying images on a transparent or semi-transparent screen. Some embodiments could make use of heads-up-display (HUD) technologies, which display images on a transparent screen using, for example, CRT images on a phosphor screen, optical waveguide technology, scanning lasers for displaying images on transparent screens as well as solid state technologies such as LEDs. Examples of solid state technologies that may be used with first display device 3230 include, but are not limited to liquid crystal displays (LEDs), liquid crystal on silicon displays (LCoS), digital micro-mirrors (DMD) and organic light emitting diodes (OLEDs). In some embodiments, first display device 3230 could comprise a plasma display device. The type of display technology used may be selected according to various factors such as display size, weight, cost, manufacturing constraints (such as space requirements), degree of transparency as well as possibly other factors.

Although some embodiments may use screens that are substantially transparent, other embodiments may use screens that are only partially transparent or translucent. The degree of transparency required may vary according to manufacturing considerations such as lighting conditions, manufacturing costs, and precision tolerances for alignment.

A flexible manufacturing system can include provisions for displaying a real-time view of a portion of an article and a displayed graphic configured to be aligned with the article. For example, in one embodiment an optical device (such as a camera) may be used to record a live feed of a display device with a displayed graphic and an article disposed beneath the display device. The live feed may then be transmitted to another display device (such as an LCD TV or LCD monitor), where the user may view the alignment between the displayed graphic and the article from a fixed viewing angle (i.e., the viewing angle of the camera).

In some embodiments, flexible manufacturing system 3200 can include provisions for capturing optical information. In one embodiment, flexible manufacturing system 3200 can include optical device 3250. Optical device 3250 may be any kind of device capable of capturing image information including both still images as well as video images. Examples of different optical devices that can be used include, but are not limited to: still-shot cameras, video cameras, digital cameras, non-digital cameras, web cameras (web cams), as well as other kinds of optical devices known in the art. The type of optical device may be selected according to factors such as desired data transfer speeds, system memory allocation, desired temporal resolution, desired spatial resolution, as well as possible other factors. In one embodiment, optical device 3250 may be a digital video camera.

Some embodiments may include a second display device 3240. As discussed below, second display device 3240 may facilitate alignment by displaying a fixed viewing angle to a user for purposes of aligning a graphic. In some embodiments, first display device 3230 may be more transparent than second display device 3240. In some embodiments, second display device 3240 may not be transparent. Instead, second display device 3240 may be configured as any kind of video screen including, but not limited to television screens, computer monitors, or other display devices. Exemplary devices include any of the devices discussed above for first display device 3230. In one embodiment, second display device 3240 could be an LCD display device, including either an LCD computer monitor or an LCD television.

In different embodiments, the display size (i.e., screen size) of second display device 3240 may vary. In some embodiments, second display device 3240 and first display device 3230 could have a similar screen size. In other embodiments, second display device 3240 could have a smaller screen size than first display device 3230. In an exemplary embodiment, second display device 3240 may have a larger screen size than first display device 3230. The screen size of second display device 3240 may be selected according to various factors including, but not limited to: the distance of second display device 3240 from first display device 3230, mounting considerations, manufacturing costs, available space as well as possibly other factors.

In different embodiments, the location of second display device 3240 relative to other components of flexible manufacturing system 3200 could vary. In the exemplary embodiment shown in the figures, second display device 3240 may be positioned approximately above printing system 3214. However, in other embodiments, the location of second display device 3240 may be placed in any other location relative to other components of flexible manufacturing system 3200 that provides easy viewing for a user of the system. Moreover, in the exemplary embodiment, second display device 3240 is seen to be suspended above printing system 3214. In other embodiments, however, second display device 3240 could be mounted directly to printing system 3214 or any other components of flexible manufacturing system 3200.

Flexible manufacturing system 3200 may include provisions for supplying printing system 3214 and/or components of alignment system 3220 with one or more graphics. In other words, flexible manufacturing system 3200 may include components or systems that send graphic information to printing system 3214, which can then be printed onto an article. In some embodiments, flexible manufacturing system 3200 may include computing system 3206. The term "computing system" refers to the computing resources of a single computer, a portion of the computing resources of a single computer, and/or two or more computers in communication with one another. Any of these resources can be operated by one or more users. In some cases, computing system 3206 can include user input device 3209 that allows a user to interact with computing system 3206. Likewise, computing system 3206 may include display 3208. Moreover, computing system 3206 can include additional provisions, such as a data storage device (not shown). A data storage device could include various means for storing data including, but not limited to: magnetic, optical, magneto-optical, and/or memory, including volatile memory and non-volatile memory. These provisions for computing system 3206, as well as possibly other provisions not shown or described here, allow computing system 3206 to facilitate the creation, storage and export of graphics to any or all of the devices and systems described here and shown in FIG. 32.

In some embodiments, for purposes of facilitating communication between printing system 3214, computing system 3206, and/or components of alignment system 3220, two or more systems or components can be connected using a network of some kind. In some embodiments, two or more components may be connected using a wireless network (not shown). Examples of wireless networks include, but are not limited to: wireless personal area networks (including, for example, Bluetooth), wireless local area networks (including networks utilizing the IEEE 802.11 WLAN standards), wireless mesh networks, mobile device networks as well as other kinds of wireless networks. In other embodiments, two or more components could be connected using a wired network, including networks whose signals are facilitated by twister pair wires, coaxial cables, and/or optical fibers. In still other cases, a combination of wired and wireless networks and/or connections could be used.

It should be understood that in some embodiments, rather than utilizing a network-type communication between various components, devices and/or systems, some components can be connected directly to each other, and may not communicate with all other components. For example, in some cases, printing system 3214 and first display device 3230 could be connected directly to computing system 3206 and could operate as peripheral devices to computing system 3206. In other words, it will be understood that a network is only intended as one possible example of a configuration for connecting various components, devices and/or systems. The type of communication method can be selected according to various factors including, for example, desired data transfer speeds, requirements for the locations of various components, ease of connectivity, compatibility between various devices, components and systems, as well as possibly other factors.

In an exemplary embodiment, computing system 3206 is in communication (through wired and/or wireless means) with both printing system 3214 and first display device 3230. This allows computing system 3206 to submit graphic information related to a pre-selected graphic to both printing system 3214 and first display device 3230. The graphic information received by first display device 3230 may be displayed for purposes of alignment. The graphic information received by printing system 3214 may be used to print a graphic onto an article, possibly after the article has been aligned or positioned using first display device 3230.

In some embodiments, optical device 3250 may be in communication with second display device 3240. This allows optical information captured by optical device 3250 to be displayed on second display device 3240. In the exemplary embodiment, the connection between optical device 3250 and second display device 3240 is indicated schematically as wired connection 3252. However, in other embodiments optical device 3250 and second display device 3240 could communicate wirelessly. It will also be understood that in some other embodiments, optical device 3250 and/or second display device 3240 may be in communication with computing system 3206 as well as any other components of flexible manufacturing system 3200.

FIG. 32 also clearly illustrates the placement of an article of footwear 3280 (also referred to simply as article 3280) and holding assembly 3270 onto platform 3260. For purposes of this description, article 3280 may be any kind of article of footwear. Moreover, holding assembly 3270 may be any kind of stand, holding device or other component configured to retain article 3280 on platform 3260. An exemplary holding assembly that may be used with any of the embodiments described throughout this detailed description is found in Miller, U.S. Patent Application Publication Number 2014/0310891, U.S. patent application Ser. No. 13/868,130, filed Apr. 23, 2013, and titled "Holding Assembly for Articles," the entirety being herein incorporated by reference. In the exemplary embodiment, holding assembly 3270 holds article 3280 in place just beneath the lower surface of first display device 3230, as shown in FIG. 34, to facilitate the alignment of a displayed graphic over article 3280.

Figure 33:
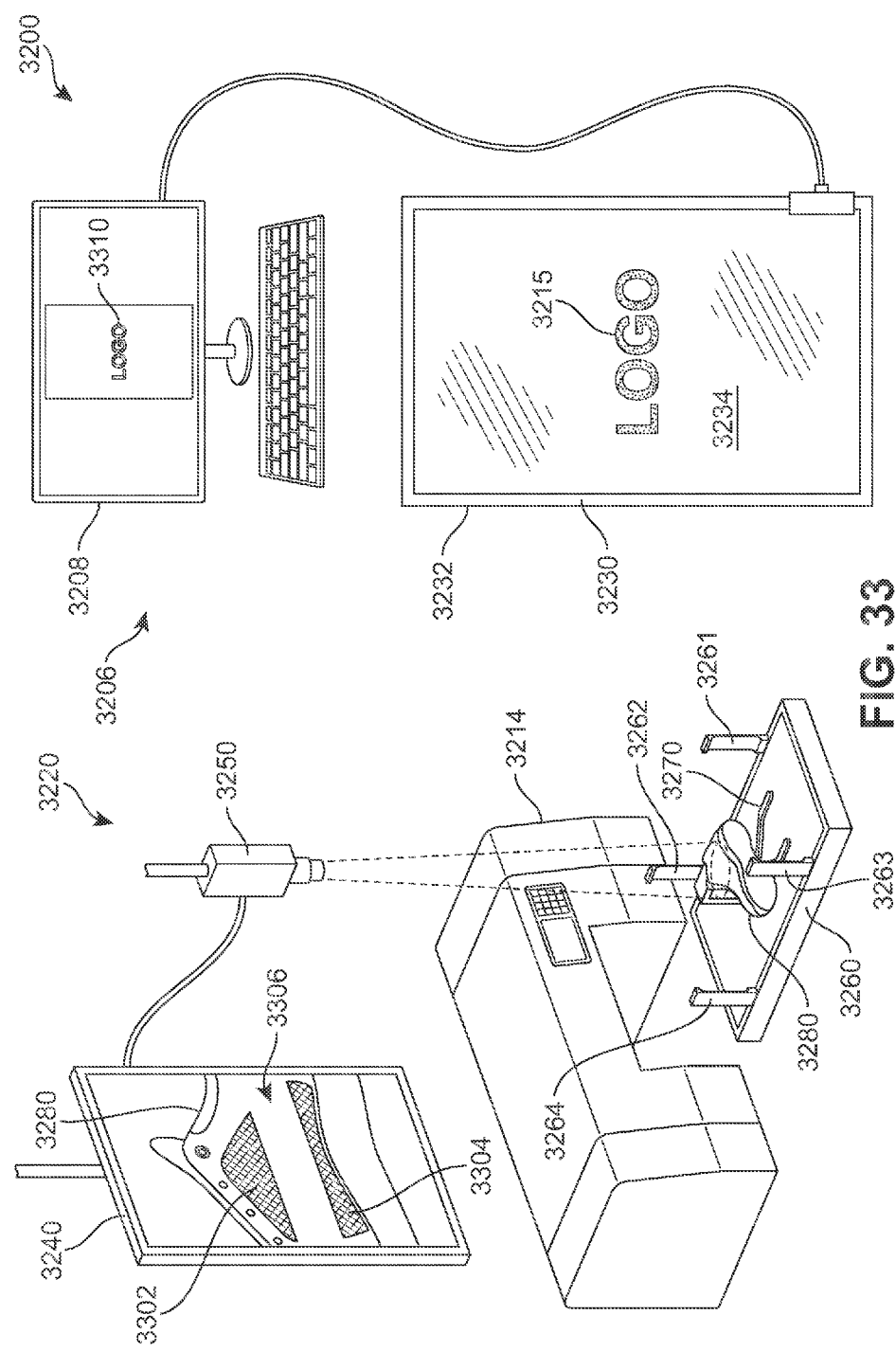
FIG. 33 is a schematic view of the flexible manufacturing system shown in FIG. 32, in which a displayed graphic is displayed on a first display device.
Figure 34:
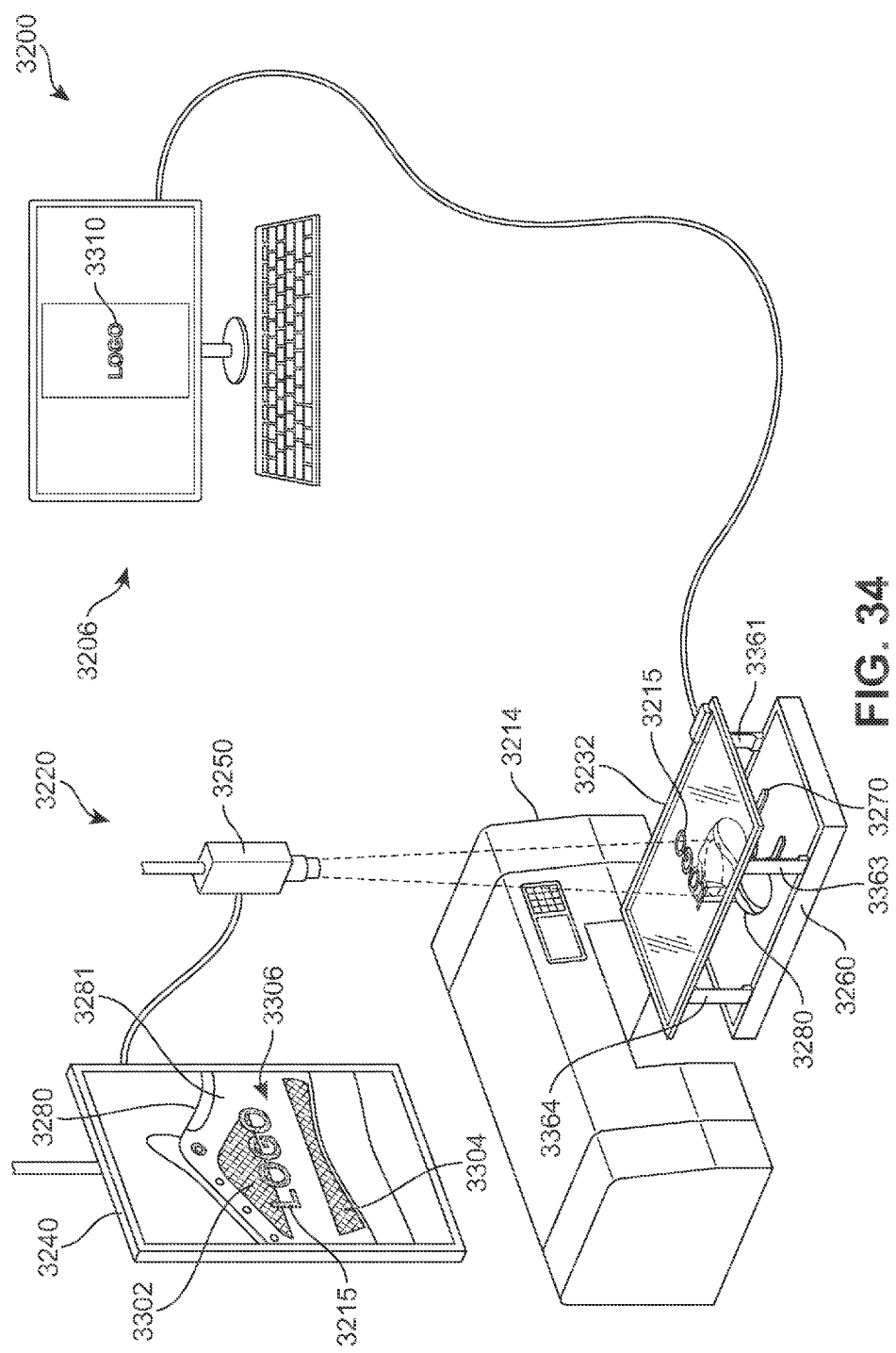
FIG. 34 is a schematic view of the flexible manufacturing system of FIG. 32, in which a first display device is mounted over a platform and an article.

FIGS. 33 and 34 illustrate schematic isometric views of flexible manufacturing system 3200, which further highlight the attachment of first display device 3230 with other components of system 3200. In order to superimpose a graphic over article 3280, system 3200 is configured with provisions for mounting first display device 3230 at a predetermined height above platform 3260. In particular, platform 3260 is further associated with one or more mounting portions including, for example, a first mounting portion 3261, a second mounting portion 3262, a third mounting portion 3263 and a fourth mounting portion 3264. These mounting portions could comprise mounting arms, columns, posts or other structures. Each mounting portion may be configured to engage a portion of first display device 3230. This arrangement allows first display device 3230 to be mounted over platform 3260, as shown in FIG. 34, so that a graphic displayed on screen portion 3234 may be superimposed over article 3280.

Although the current embodiment illustrates four mounting portions for attaching and aligning first display device 3230 with platform 3260, other embodiments could include any other number of mounting portions, comprised of any kind of mounting structures. Moreover, in some embodiments, supporting features may be used in conjunction with separate alignment features. For example, some embodiments could use four mounting portions for first supporting first display device 3230, and two or more alignment pins that ensure that first display device 3230 is properly aligned over platform 3260.

In order to ensure that a printer can associate with a surface of an article, a display device can be removably fastened or mounted to platform 3260. In one embodiment, for example, first display device 3230 is configured to rest on mounting portions or other support structures in a manner that restricts horizontal movement but allows for first display device 3230 to be easily lifted off the mounting portions or support structures. In other embodiments, flexible manufacturing system 3200 could include fastening systems for temporarily securing first display device 3230 to platform 3260.

As an example of one possible use of flexible manufacturing system 3200, FIGS. 33-39 illustrate some possible steps in a method of printing a graphic onto a predetermined portion of an article. In this exemplary embodiment, the word "LOGO" may be printed directly onto the upper of the article. The exemplary method illustrates this and shows steps of aligning the article on a platform to achieve proper alignment between the article and a printing system.

As previously mentioned, the term graphic is not intended to be limiting. In particular, the term "graphic" as used throughout this detailed description and in the claims refers to any visual design elements including, but not limited to:

photos, logos, text, illustrations, lines, shapes, images of various kinds as well as any combinations of these elements. Moreover, the term graphic could incorporate any number of contiguous or non-contiguous visual features. For example, in one embodiment, a graphic may comprise a logo that is applied to a small region of an article of footwear. In another embodiment, a graphic may comprise a large region of color that is applied over one or more portions of an article of footwear.

FIG. 33 illustrates a schematic view of flexible manufacturing system 3200. Referring to FIG. 33, first display device 3230 may be further configured to display one or more graphics on screen portion 3234. In the current embodiment, for example, first display device 3230 receives information from computing system 3206 about computer graphic 3310. For purposes of illustration, computer graphic 3310 is shown on display 3208 of computing system 3206. This information is displayed by first display device 3230 as displayed graphic 3215, which appears in a central portion of screen portion 3234. This arrangement may allow a viewer to see various graphics superimposed over real-world objects (such as an article) when the objects are viewed through first display device 3230. In particular, this arrangement allows a graphic to be superimposed over an article, in order to align the graphic with the article for printing. Details of this method are discussed in further detail below.

First display device 3230 may be used to facilitate alignment of an article on platform 3260. In an exemplary embodiment, the relative position of first display device 3230 above platform 3260 can be calibrated to ensure proper alignment of an article. In some embodiments, the calibration of the position may be achieved in a similar manner to the calibration process described above and shown in FIGS. 3-6 of an earlier embodiment. Specifically, in some embodiments, the calibration process could be achieved as follows. First, a graphic (such as a grid or other graphic useful for alignment/calibration) may be printed onto a sheet covering the area of platform 3260 using printing system 3214. Next, platform 3260 may be positioned to receive first display device 3230. The same graphic printed onto the sheet may then be displayed on first display device 3260. The position of the graphic on first display device 3230 may then be adjusted until the displayed graphic is vertically aligned over the printed graphic. Of course, in other embodiments, any other methods of calibrating a printing system with a device or other component could be used.

With the relative position of first display device 3230 over platform 3260 properly calibrated, system 3200 may be used to align a graphic over a predetermined portion of an article, so that the graphic may be printed onto the predetermined portion using printing system 3214. As seen in FIG. 34, the first step in aligning a graphic over an article is to position the article under the display device. In the exemplary embodiment, article 3280 is positioned beneath first display device 3230. Moreover, displayed graphic 3215 is displayed on first display device 3230. Because first display device 3230 is at least partially transparent, displayed graphic 3215 can be seen to be superimposed over article 3280.

In order to improve alignment between a graphic and an article, alignment system 3220 is provided with a second display device 3240 and an optical device 3250, as already described above. In this embodiment, optical device 3250 captures image information including a predetermined portion 3306 of article 3280. For purposes of illustration, predetermined portion 3306 is a section of an upper 3281 of article 3280. In the exemplary embodiment, predetermined portion 3306 may be disposed between a first mesh portion 3302 and a second mesh portion 3304 of upper 3281. In this exemplary embodiment, system 3200 may be used to apply a printed graphic (in this case the word "LOGO") onto predetermined portion 3306.

The image information captured by optical device 3250 is sent to, and displayed by, second display device 3240. In particular, a portion of article 3280 is visible on second display device 3240, including the predetermined portion 3306. Additionally, displayed graphic 3215 may be visible on second display device 3240.

Figure 35:
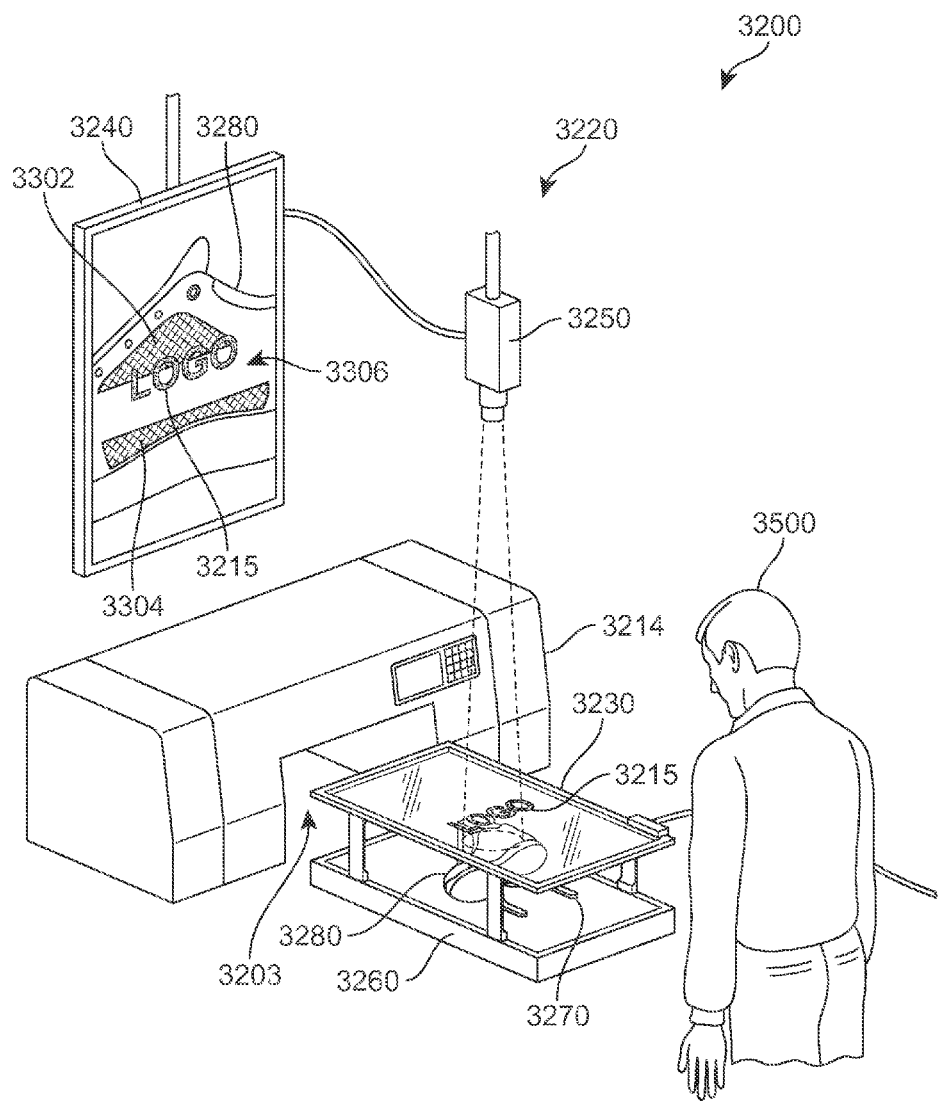
FIG. 35 is a schematic view of the flexible manufacturing system of FIG. 32, in which a user is preparing to align an article with a displayed graphic.
Figure 36:
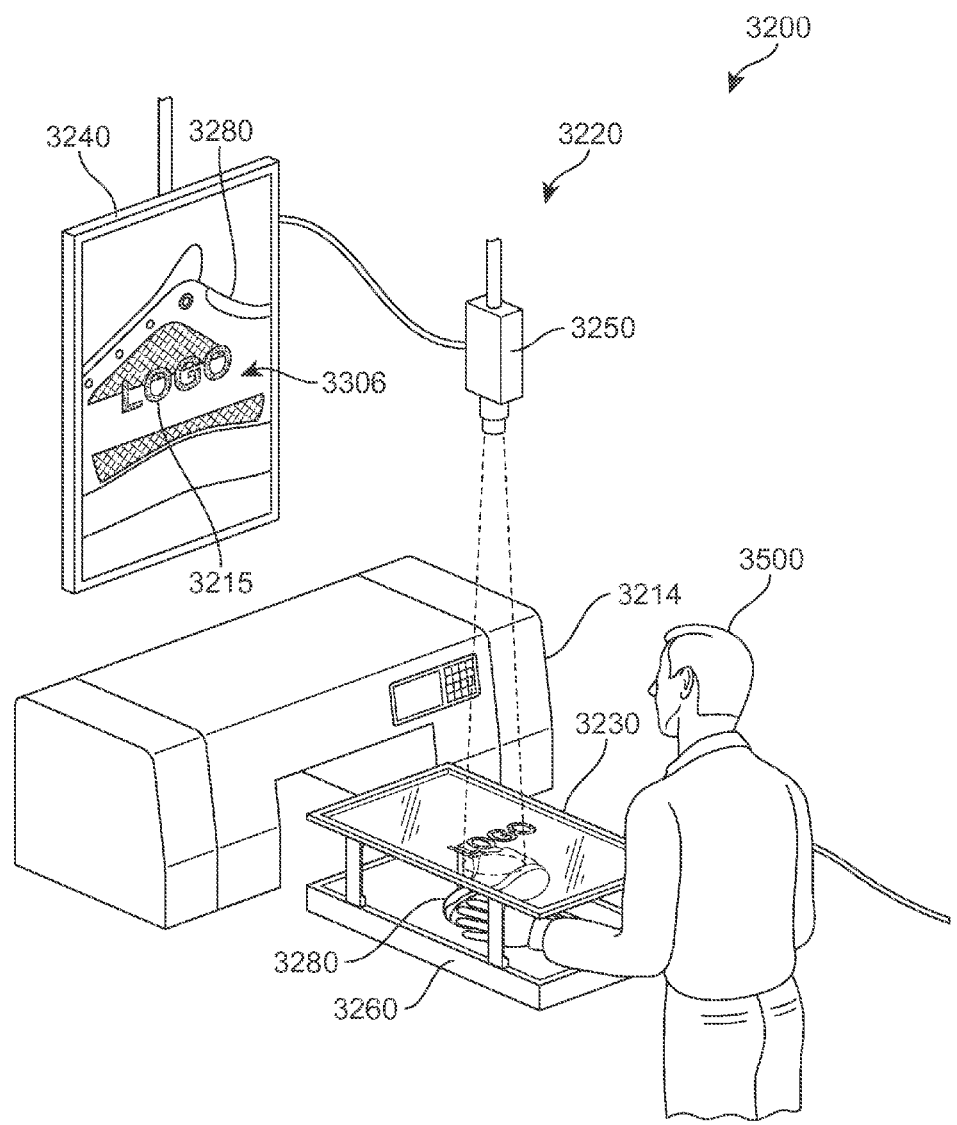
FIG. 36 is a schematic view of the flexible manufacturing system of FIG. 35, in which a user is watching a second display device while aligning the article under the displayed graphic.
Figure 37:
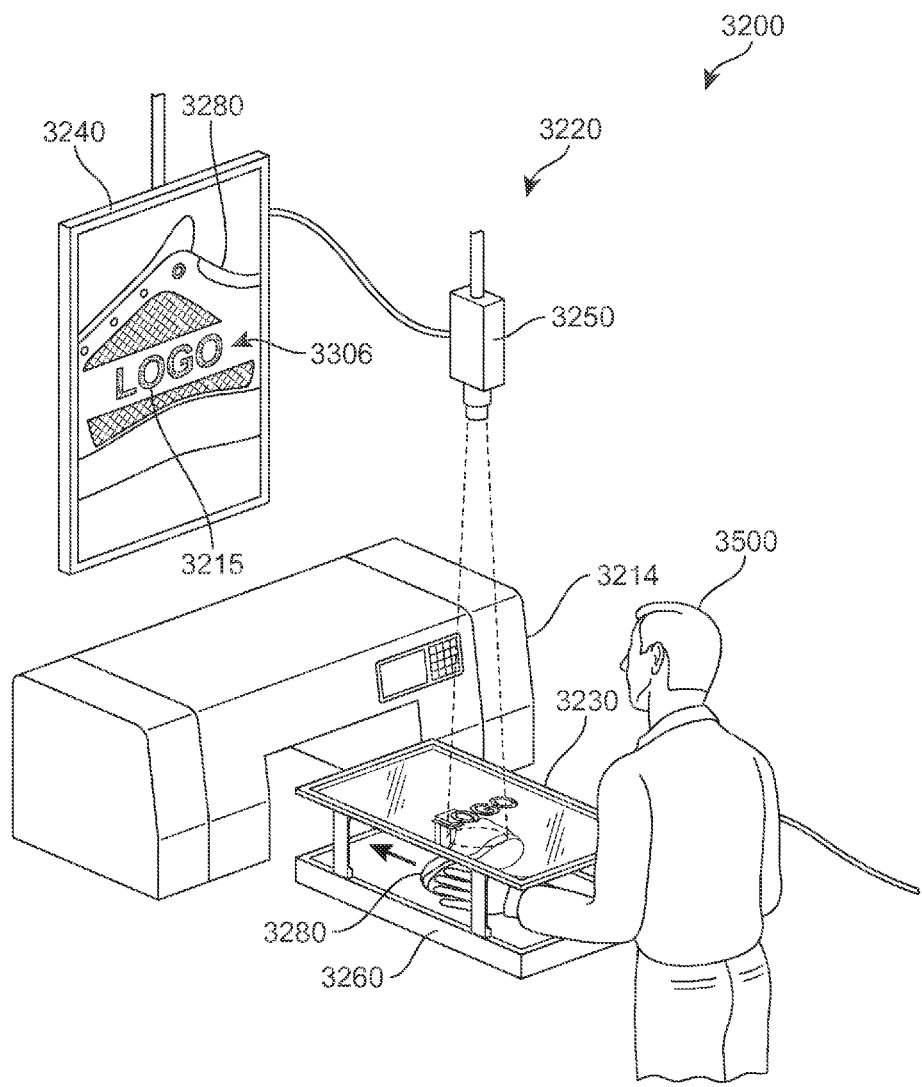
FIG. 37 is a schematic view of the flexible manufacturing system of FIG. 36, in which the article has been aligned under the displayed graphic.

FIGS. 35 through 37 illustrate an exemplary process for aligning a graphic onto article 3280. In FIGS. 35 through 37, user 3500 may utilize components of flexible manufacturing system 3200 to achieve the desired alignment.

As seen in FIG. 35, platform 3260 is in a first relative configuration with respect to printing system 3214. In this configuration, platform 3260 is disposed in front of printing system 3214, and outside of printing bay 3203. In this configuration, a user may easily adjust the position of article 3280 (and holding assembly 3270) on platform 3260 in order to achieve the desired alignment. In this exemplary embodiment, user 3500 may stand adjacent to platform 3260 after placing article 3280 on platform 3260, with first display device 3230 in place over platform 3260.

In the exemplary embodiment, user 3500 intends to position displayed graphic 3215 on predetermined portion 3306, which is disposed between first mesh portion 3302 and second mesh portion 3304. As seen in FIG. 35, display graphic 3215 is initially positioned over article 3280 such that display graphic 3215 overlaps partially with first mesh portion 3302 and predetermined portion 3306. In other words, in this initial position, displayed graphic 3215 is not aligned directly over predetermined portion 3206, and between first mesh portion 3302 and second mesh portion 3304.

In different embodiments, the alignment of displayed graphic 3215 over predetermined portion 3306 can be accomplished in different manners. In some embodiments, the position of displayed graphic 3215 on first display device 3230 can be changed, for example, using computing system 3206. Computing system 3206 would then communicate the updated position for displayed graphic 3215 to printing system 3214 prior to printing. In other embodiments, however, alignment could be achieved by moving article 3280 (and holding assembly 3270) on platform 3260, until the desired portion of article 3280 is positioned directly below displayed graphic 3215. In the exemplary embodiment shown in FIGS. 35 through 37, alignment of displayed graphic 3215 and predetermined portion 3306 is achieved by adjusting the position of article 3280 beneath displayed graphic 3215 (which stays in place).

FIGS. 36 and 37 illustrate the intended use of second display device 3240 for aligning displayed graphic 3215 with predetermined portion 3306 of article 3280. As seen in FIG. 36, user 3500 may view the alignment of article 3280 and displayed graphic 3215 on second display device 3240. Because optical device 3250 is positioned directly over second display device 3240, the viewing angle of the alignment area shown on second display device 3240 may facilitate more precise alignment than could be achieved by a user looking directly at first display device 3230. The discrepancy in viewing angles between the view captured by optical device 3250 and a direct view of first display device 3230 and article 3280 seen by user 3500 is discussed in further detail below.

As seen in FIG. 37, user 3500 has moved article 3280 and holding assembly (not visible) slightly closer to printing system 3214 until displayed graphic 3215 is aligned with predetermined portion 3306, as seen on second display device 3240. With displayed graphic 3215 now aligned with predetermined portion 3306, the printing of the graphic onto article 3280 can proceed.

Figure 38:
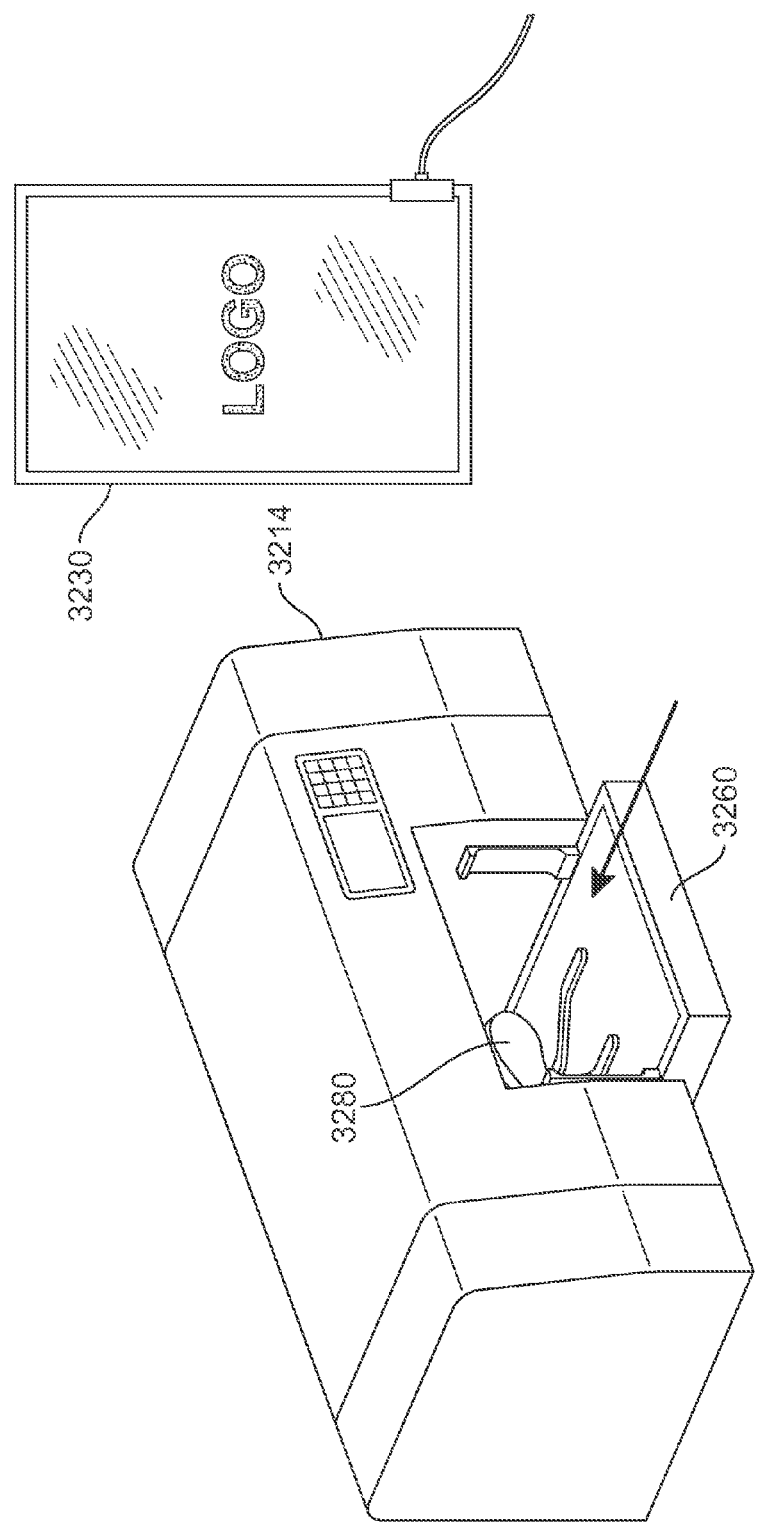
FIG. 38 is a schematic view of an embodiment of a platform and an article disposed within a printing system.
Figure 39:
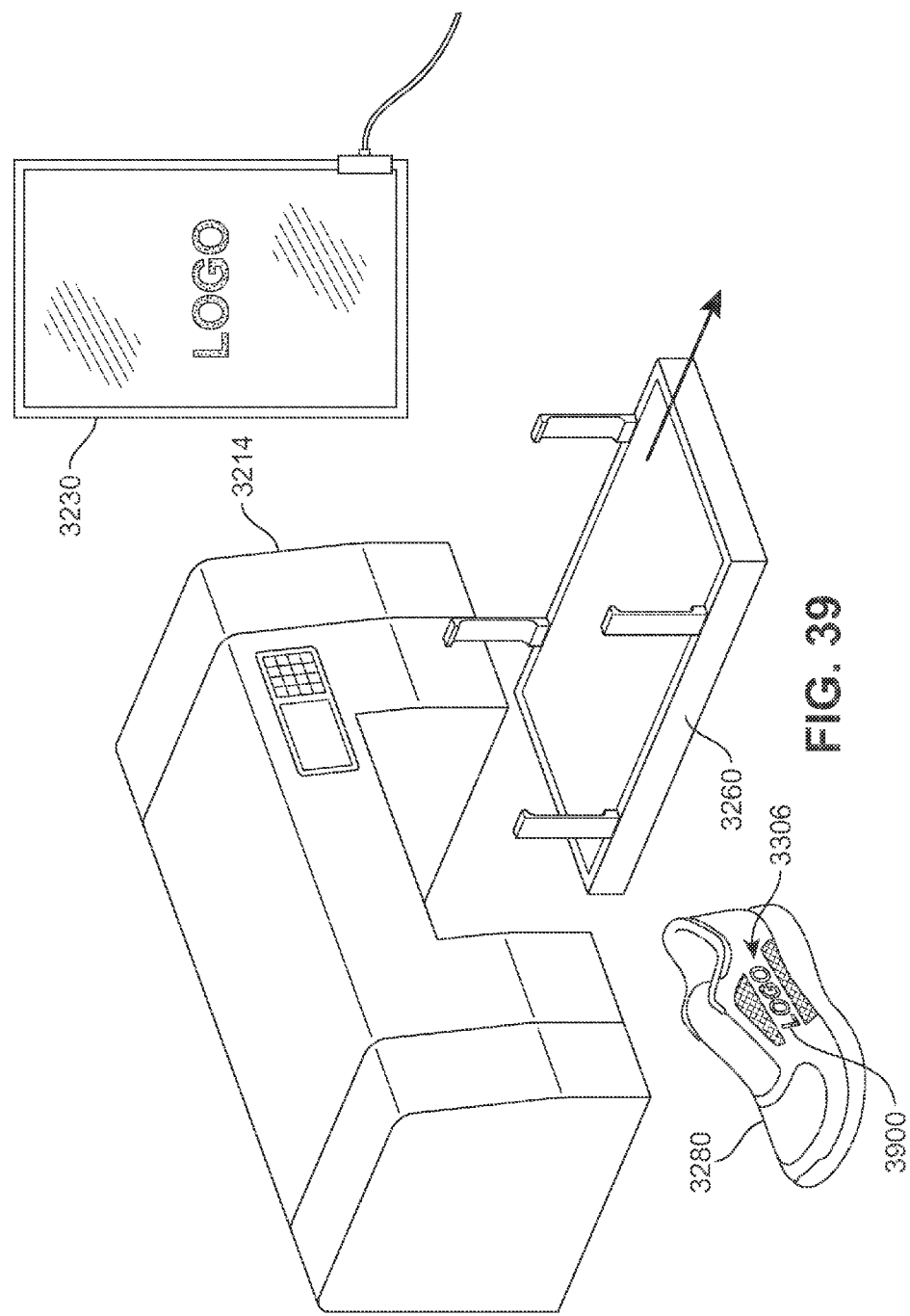
FIG. 39 is a schematic view of components of a flexible manufacturing system and an article, after printing with a printing system.

FIGS. 38 and 39 illustrate the printing of a graphic onto article 3280 following the alignment process shown in FIGS. 35 through 37. As seen in FIG. 38, once first display device 3230 has been removed, platform 3260 may be placed in a second relative configuration with respect to printing system 3214. In the second relative configuration, platform 3260 is positioned within printing system 3214 so that article 3280 is positioned for printing.

FIG. 39 illustrates a schematic view of article 3280 after printing. As seen in FIG. 39, a printed graphic 3900, corresponding to displayed graphic 3215, has been printed onto article 3280. Moreover, printed graphic 3900 has been printed on predetermined portion 3306, as desired.

Figure 40:
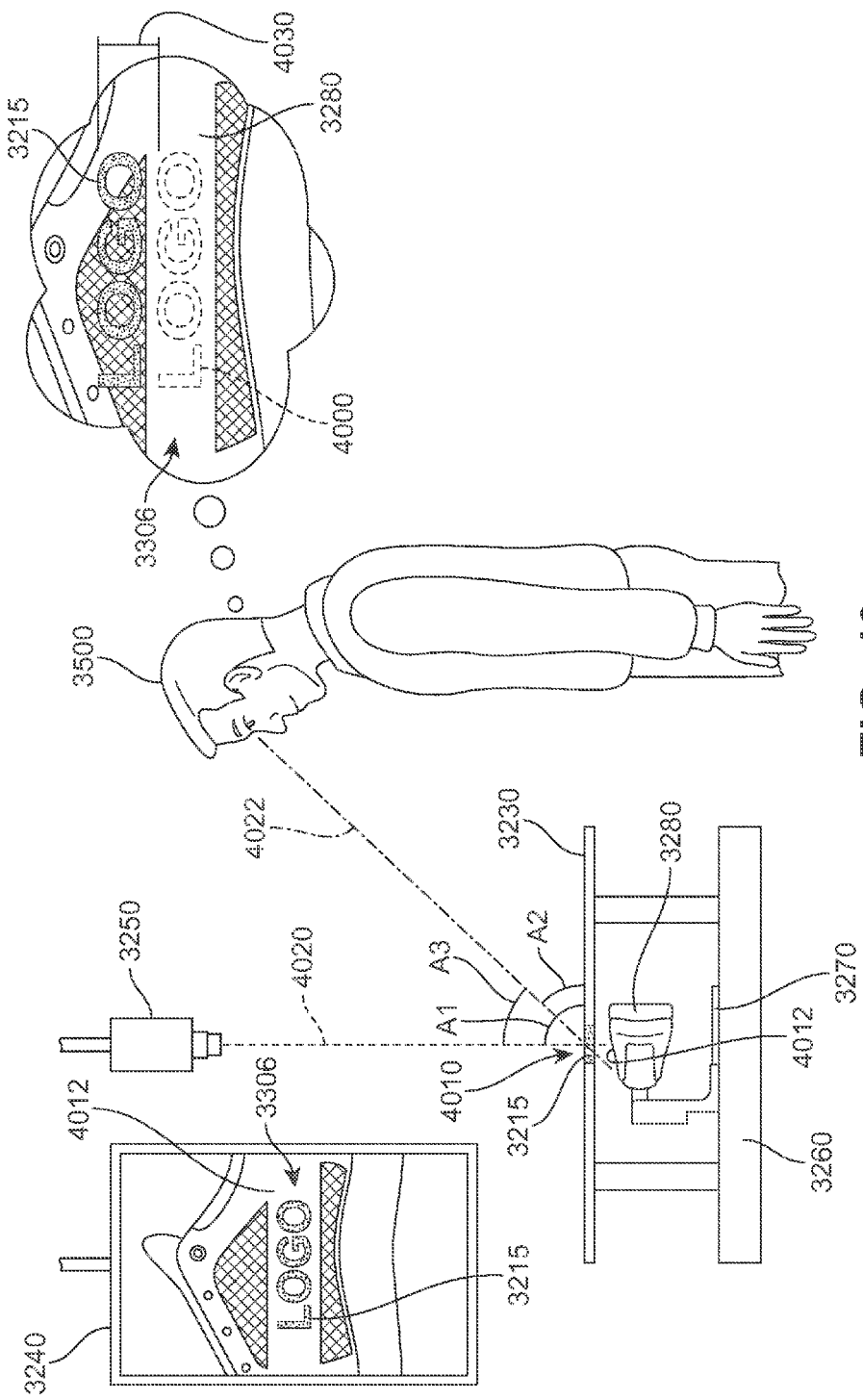
FIG. 40 is a schematic view showing two different viewing angles of a display device and an article.
Figure 41:
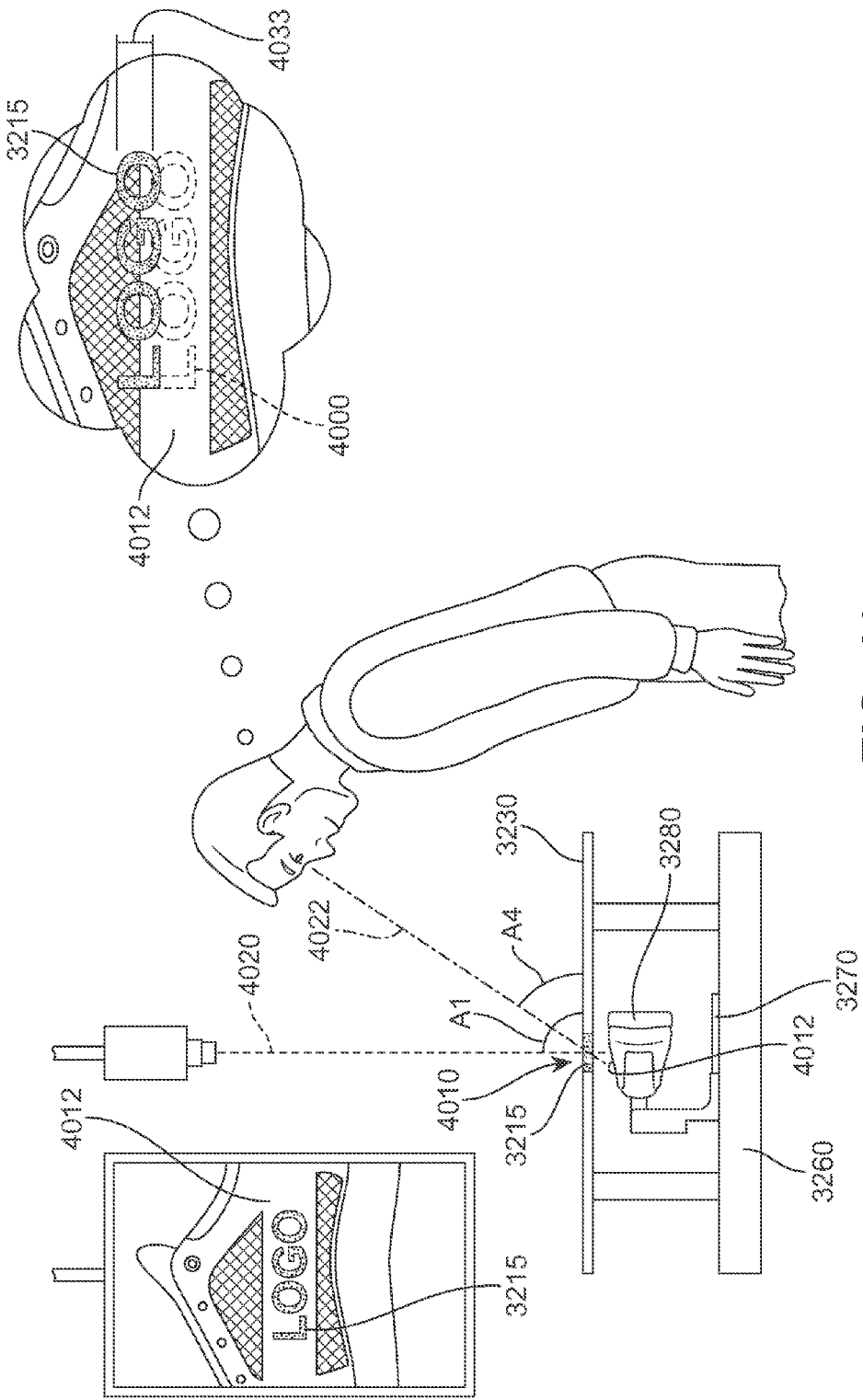
FIG. 41 is another schematic view showing two different viewing angles of a display device and an article.

FIGS. 40 and 41 illustrate schematic views of different viewing angles for user 3500 when operating flexible manufacturing system 3200. As seen in FIGS. 40 and 41, optical device 3250 is positioned directly over platform 3260, article 3280 and first display device 3230. For purposes of characterizing viewing angles, optical device 3250 is seen to have a line of sight 4020 that connects optical device 3250 and a predetermined portion 4012 of article 3280. This line of sight forms a viewing angle A1, which is an angle measured at the intersection of line of sight 4020 and the surface of first display device 3230.

In different embodiments, the value of viewing angle A1 can vary. In some embodiments, viewing angle A1 may vary approximately in the range between 70 and 110 degrees. In other embodiments, viewing angle A1 could be less than 70 degrees. In still other embodiments, viewing angle A1 could be greater than 110 degrees. In an exemplary embodiment, viewing any A1 may be approximately in the range between 80 and 100 degrees. Such a range of viewing angles provides an approximately vertical viewing angle for optical device 3250.

The effect of this overhead or vertical viewing angle is to ensure alignment occurs between a first portion 4010 of first display device 3230 and a first portion 4012 of article 3280 that is disposed directly beneath first portion 4010 of first display device 3230. Thus, in this example, displayed graphic 3215, which is disposed within first portion 4010 of first display device 3230, is seen to be directly over first portion 4110 of article 3280 when viewed on second display device 3240.

However, as seen in FIG. 40, the direct viewing angle of user 3500 is different from the view captured by optical device 3250. Specifically, since user 3500 is located off to the side of platform 3260, user 3500 has a line of sight 4022 of first portion 4112 of article 3280 that is angled with respect to the line of sight 4020 of optical device 3250. In particular, the user's line of sight 4022 forms a viewing angle A2 with the surface of first display device 3230. Moreover, because article 3280 is slightly below first display device 3230, the difference in viewing angle causes user 3500 to see displayed graphic 3215 and first portion 4112 of article 3280 as slightly misaligned from their true alignment (indicated in phantom as graphic position 4000). Here, the difference in the vertical line of sight 4020 of optical device 3250 and line of sight 4022 of user 3500 is characterized by a non-zero angle A3 (e.g., angle A3=angle A1−angle A2). This difference in viewing angles translates into a misalignment distance 4030 on article 3280. In other words, if the alignment of displayed graphic 3215 and predetermined portion 3306 were determined using the user's viewing angle, rather than the viewing angle of optical device 3250, the resulting printing graphic would be a distance 4030 away from the desired location on article 3280.

Furthermore, as shown in FIG. 41, the viewing angle of user 3500 depends on his positioning relative to platform 3260. For example, as user 3500 leans over, his viewing angle is adjusted to a viewing angle A4, so that he sees a slightly different alignment between displayed graphic 3215 and first portion 4012 of article 3280. The difference between viewing angle A4 and viewing angle A1 translates into a misalignment distance 4033 on article 3280.

Thus, not only is the viewing angle of user 3500 different from a vertical overhead viewing angle (as captured by optical device 3250), but the user's viewing angle changes depending on the physical configuration of user 3500 (e.g., if the user is standing, sitting, leaning over, etc.). Moreover, as flexible manufacturing system 3200 is intended for use by multiple different users, each user's direct view of first display device 3230 and article 3280 will vary according to his or her height. This results in an inability to correct the viewing angle problem using a systematic offset that could be applied to correct for misalignment. It will therefore be understood that providing a fixed viewing angle for aligning an article beneath first display device 3230 may help reduce alignment errors.

In further embodiments, the methods and systems discussed here could be applied to a range of different articles, thereby allowing a user to align a graphic for printing onto other kinds of articles. Examples of other articles include, but are not limited to, articles of clothing (socks, shirts, pants, etc.). Furthermore, these methods could be used with sports equipment including, but not limited to: bats, balls, gloves, pads as well as other kinds of sporting equipment.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A flexible manufacturing system for an article, comprising:
    a printing system;
    a first display device that is calibrated with the printing system, wherein the first display device is transparent and wherein the first display device can be used to align a graphic that is to be printed onto the article by the printing system;
    an optical device for capturing image information associated with the first display device and the article;
    a second display device configured to display the image information; and
    wherein the optical device captures the image information at a fixed viewing angle for aligning the graphic with the article, wherein the viewing angle is an angle between a line of sight connecting the optical device and the article and a surface of the first display device.

2. The flexible manufacturing system according to claim 1, wherein the viewing angle has a value in the range between 70 degrees and 110 degrees.

3. The flexible manufacturing system according to claim 1, wherein the optical device is disposed above the first display device.

4. The flexible manufacturing system according to claim 1, wherein the second display device is positioned so that the second display device is visible to a user standing next to the printing system.

5. The flexible manufacturing system according to claim 1, wherein the flexible manufacturing system further includes a platform, and wherein the article can be placed on the platform.

6. The flexible manufacturing system according to claim 5, wherein the platform includes one or more mounting portions used to mount the first display device over the platform.

7. The flexible manufacturing system according to claim 5, wherein a height of the first display screen above the platform is large enough to accommodate the article.

8. A flexible manufacturing system for an article, comprising:
   a printing system configured to move from a first configuration relative to the article to a second configuration relative to the article;
   a first display device that is calibrated with the printing system,
      wherein the first display device is transparent and
      wherein the first display device can be used to align a graphic that is to be printed onto the article by the printing system when the printing system is in the first configuration;
   an optical device for capturing image information associated with the first display device and the article;
   a second display device configured to display the image information; and
   wherein the optical device captures the image information at a fixed viewing angle for aligning the graphic with the article, wherein the viewing angle is an angle between a line of sight connecting the optical device and the article and a surface of the first display device.

9. The flexible manufacturing system according to claim 8 further comprising a platform,
   wherein the first display device is removably fastened to the platform when the printing system is in the first configuration, and
   wherein the article is disposed between the platform and the first display device when the printing system is in the first configuration.

10. The flexible manufacturing system according to claim 9, wherein, when the printing system is in the second configuration, the article is disposed between the platform and the printing system.

11. The flexible manufacturing system according to claim 8, wherein the transparent display includes a liquid crystal display.

12. The flexible manufacturing system according to claim 8, wherein the second display device is includes a liquid crystal display.

13. The flexible manufacturing system according to claim 8, wherein the second display device is positioned proximate the printing system.

14. The flexible manufacturing system according to claim 13, wherein the second display device is suspended above the printing system.

15. The flexible manufacturing system according to claim 13, wherein the second display device is mounted on the printing system.

16. A flexible manufacturing system for an article, comprising:
   a printing system;
   a first display device that is calibrated with the printing system,
      wherein the first display device can be used to align a graphic that is to be printed onto the article by the printing system, and
      wherein the first display device is positioned over the article when the printing system is in a first position;
   an optical device for capturing image information associated with the first display device and the article when the first display device is positioned over the article;
   a second display device configured to display the image information,
      wherein the second display device is positioned proximate the printing system, and
      wherein the optical device captures the image information at a fixed viewing angle for aligning the graphic with the article, wherein the viewing angle is an angle between a line of sight connecting the optical device and the article and a surface of the first display device.

17. The flexible manufacturing system according to claim 16, wherein the first display device is transparent.

18. The flexible manufacturing system according to claim 16, wherein the first display device is configured to be removed when the printing system is in a second position, wherein the second position places the printing system over the article.

19. The flexible manufacturing system according to claim 16, wherein at least one of the first display device and the second display device is a liquid crystal display.

* * * * *